United States Patent
Chan et al.

(10) Patent No.: US 10,754,101 B1
(45) Date of Patent: Aug. 25, 2020

(54) FABRICATION OF UNIVERSAL HERMETIC OPTICAL FIBER CONNECTOR

(71) Applicant: The Boeing Company, Chicago, IL (US)

(72) Inventors: Eric Y. Chan, Mercer Island, WA (US); Dennis G. Koshinz, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/671,202

(22) Filed: Nov. 1, 2019

(51) Int. Cl.
  *G02B 6/38* (2006.01)
  *G02B 6/44* (2006.01)
  *B64D 37/00* (2006.01)
  *B64F 5/10* (2017.01)
  *G01F 23/292* (2006.01)

(52) U.S. Cl.
  CPC ......... *G02B 6/3834* (2013.01); *B64D 37/005* (2013.01); *B64F 5/10* (2017.01); *G01F 23/292* (2013.01); *G02B 6/3846* (2013.01); *G02B 6/4471* (2013.01)

(58) Field of Classification Search
  CPC .. G02B 6/3834; G02B 6/3846; G02B 6/4471; B64F 5/10; G01F 23/292; B64D 37/005
  See application file for complete search history.

(56) References Cited

U.S. PATENT DOCUMENTS

| 10,175,087 | B2 | 1/2019 | Chan et al. | |
| 10,352,755 | B2 | 7/2019 | Truong et al. | |
| 10,451,469 | B2 | 10/2019 | Chan et al. | |
| 2020/0088957 | A1* | 3/2020 | Durrant | G02B 6/3846 |
| 2020/0150352 | A1* | 5/2020 | Durrant | G02B 6/3846 |

OTHER PUBLICATIONS

Page from Radiall website downloaded on Sep. 22, 2019.
Page from Solid Sealing Technology website downloaded on Sep. 22, 2019.

* cited by examiner

*Primary Examiner* — John Bedtelyon
(74) *Attorney, Agent, or Firm* — Ostrager Chong Flaherty & Broitman P.C.

(57) ABSTRACT

A ruggedized hermetic optical fiber connector and methods for fabricating such an optical fiber connector which has both durability and hermeticity. The hermetic optical fiber connector is epoxy free and hermeticity is achieved by a sequence of high-temperature soldering steps with a proper soldering temperature hierarchy. The design of the hermetic optical fiber connector is universal for both glass optical fiber and plastic optical fiber connections. In addition, the universal hermetic optical fiber connector is ruggedized to withstand harsh avionics environments without incurring optical fiber damage inside the connector.

22 Claims, 20 Drawing Sheets

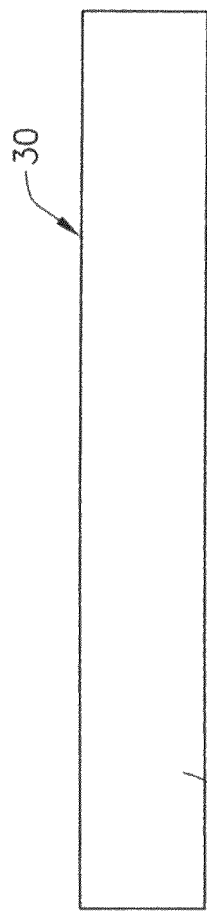
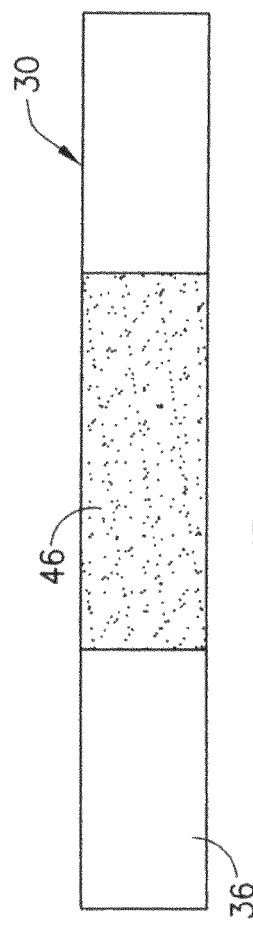
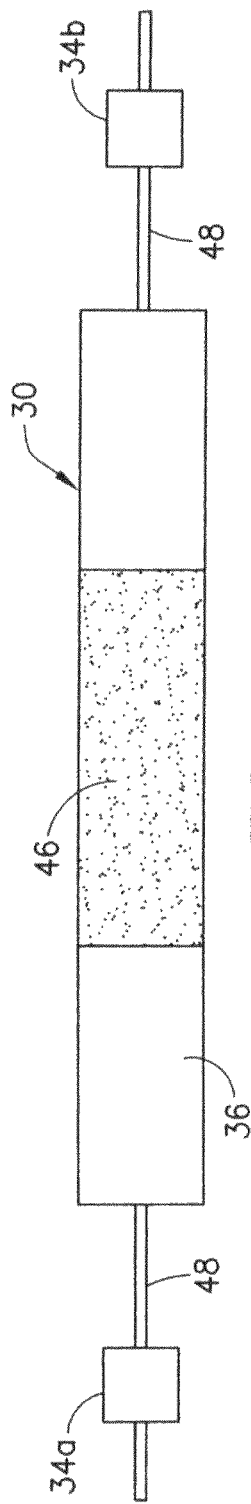

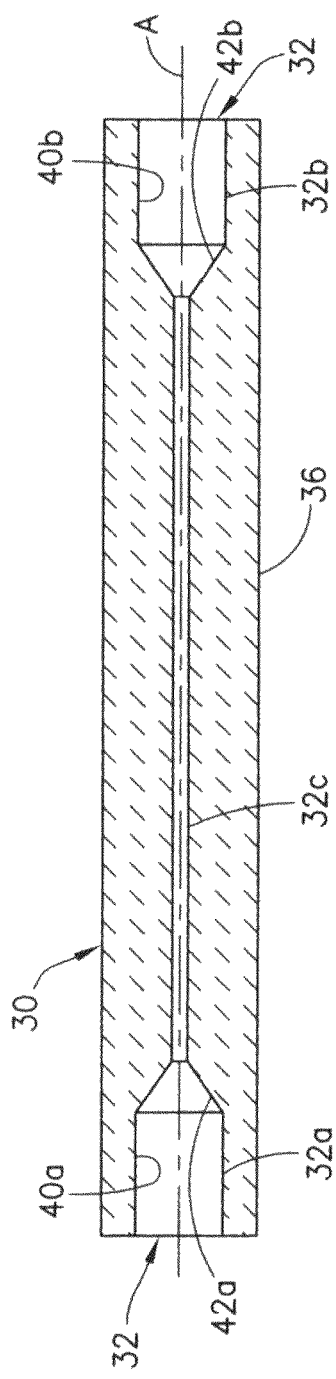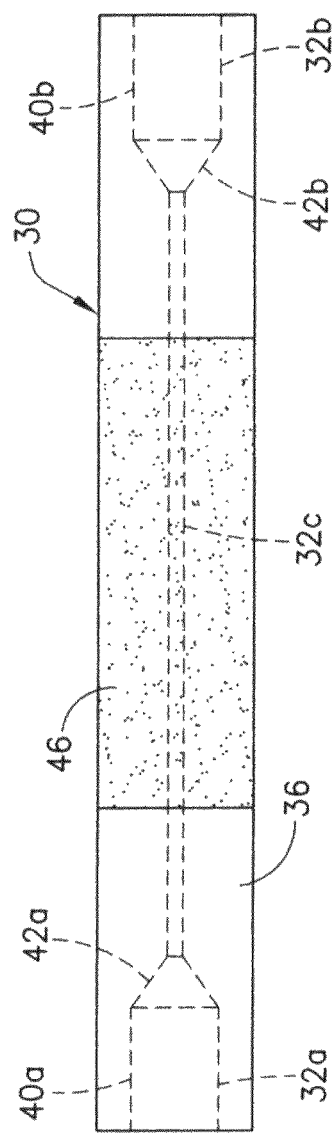
FIG.2A
FIG.2B

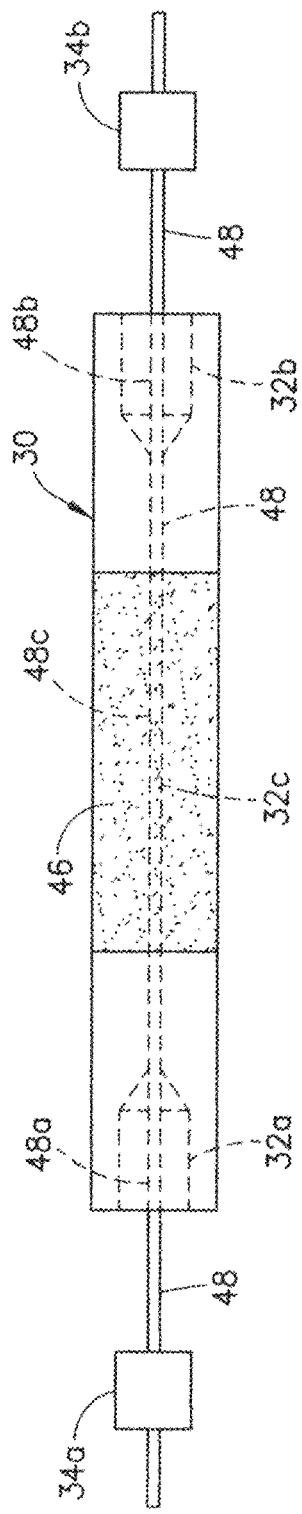
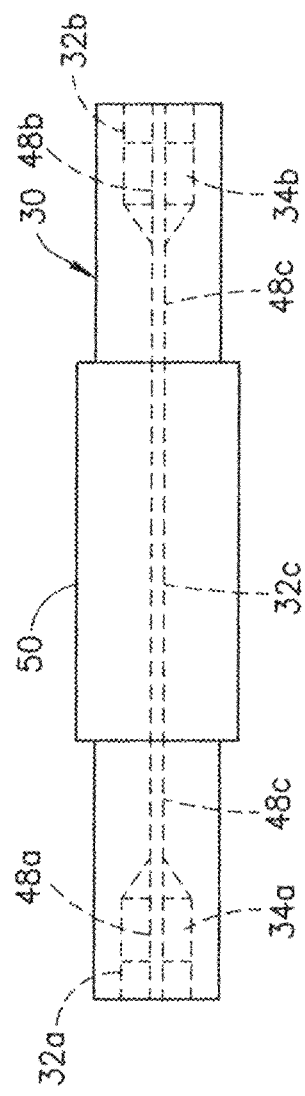
FIG.2C
FIG.2D

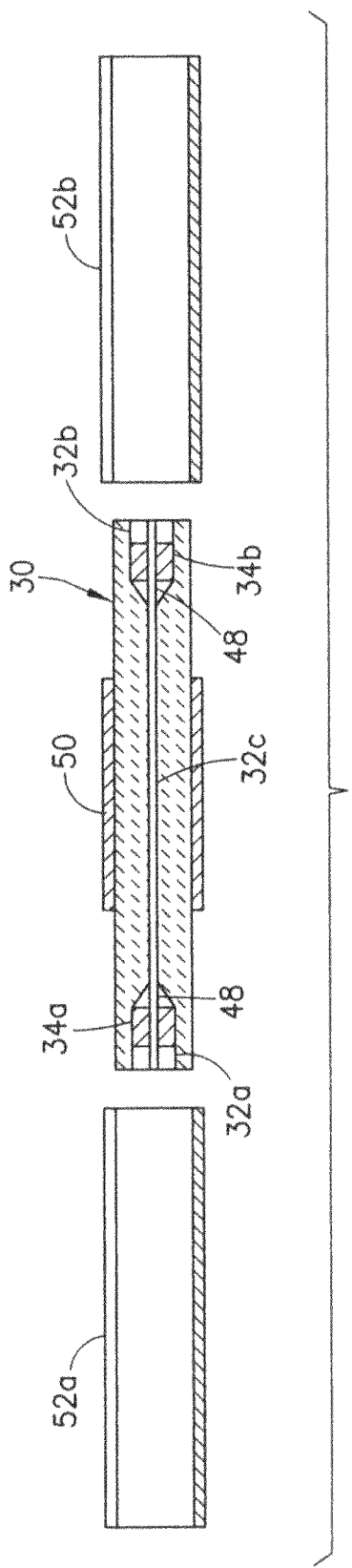
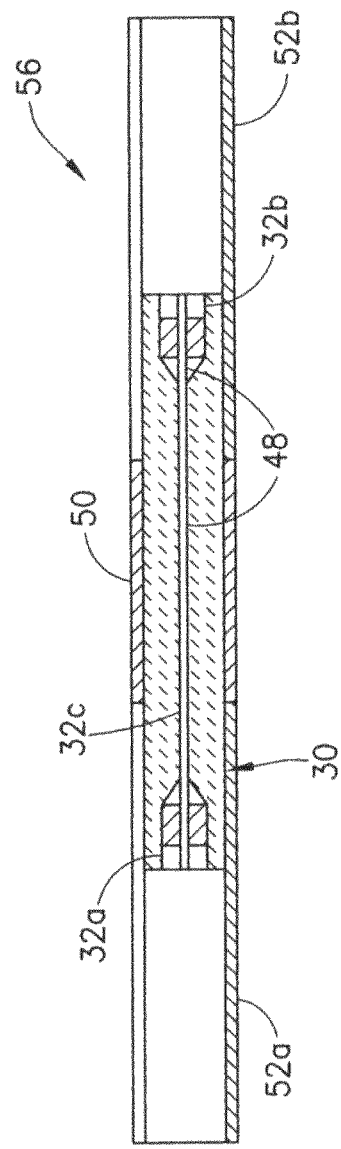
FIG.2E
FIG.2F

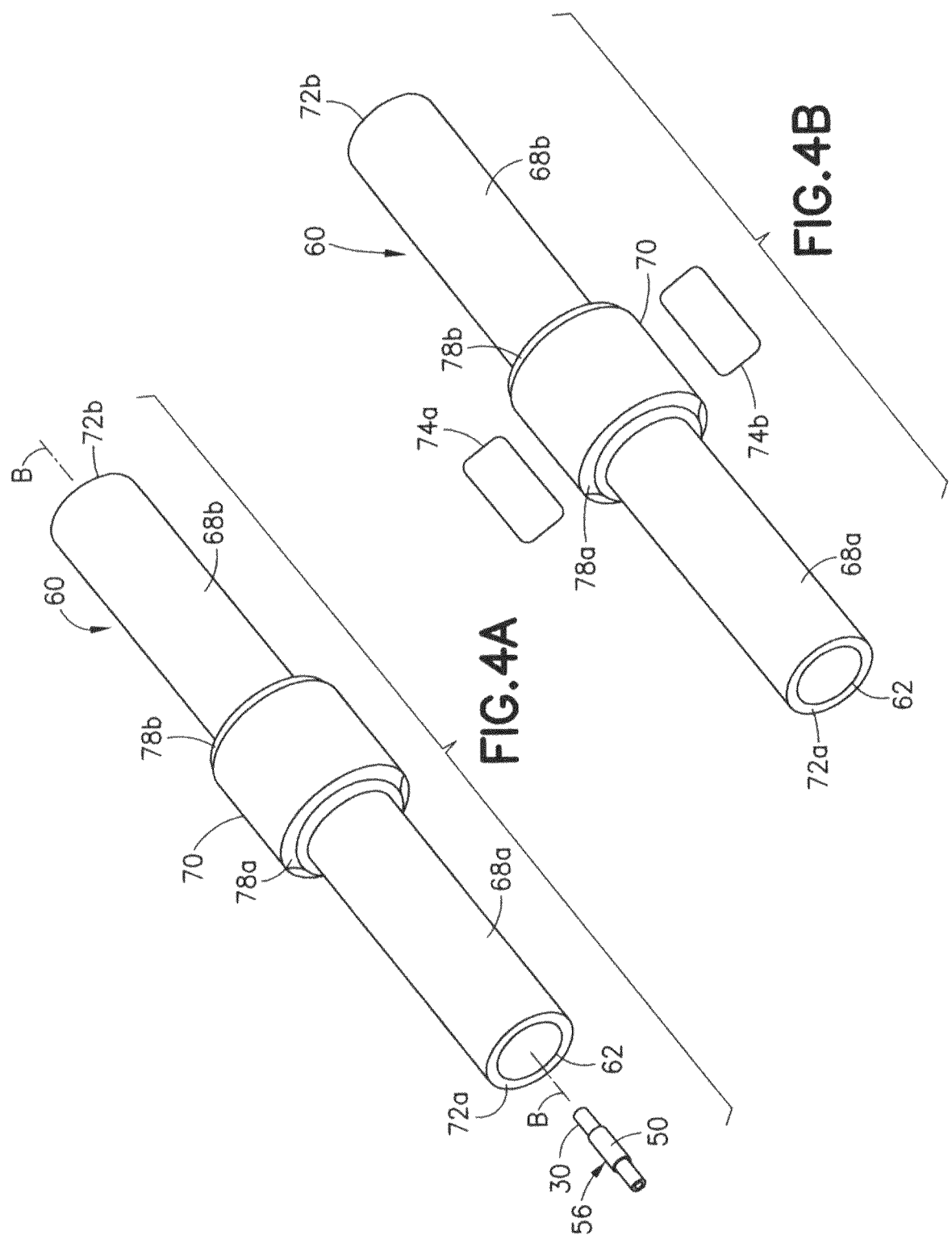

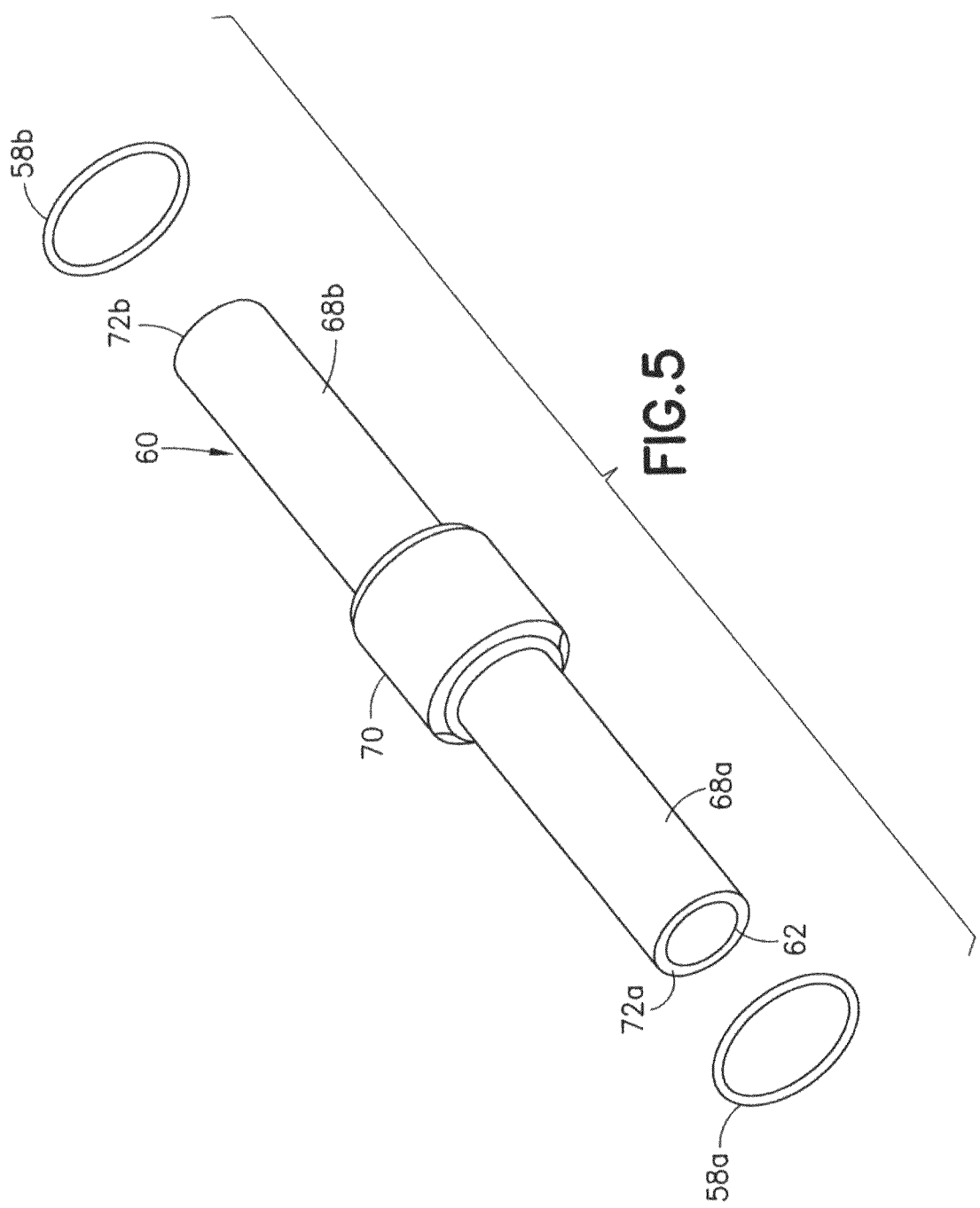

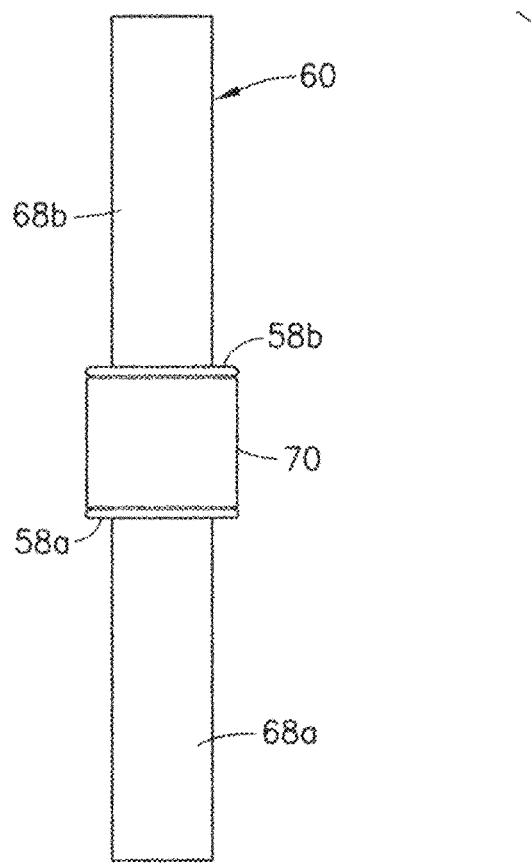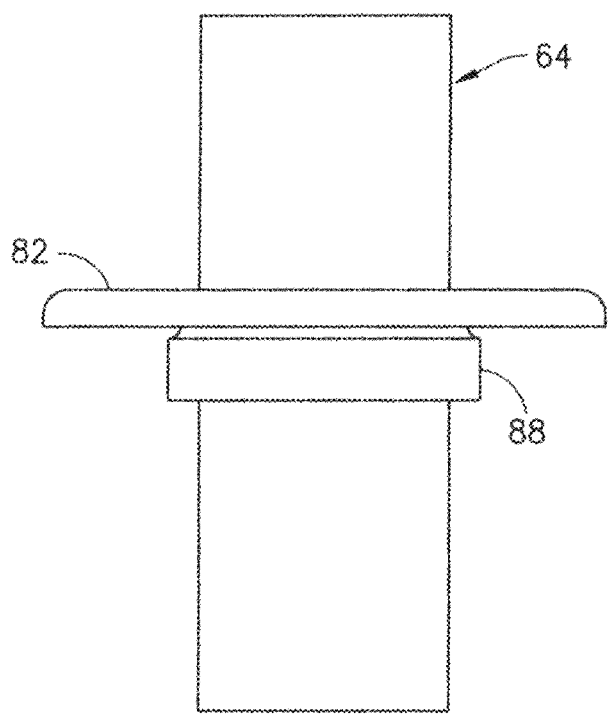
FIG. 6A

FABRICATION OF UNIVERSAL HERMETIC OPTICAL FIBER CONNECTOR

BACKGROUND

This disclosure generally relates to design and fabrication of optical fiber connectors. In particular, this disclosure relates to hermetic optical fiber connectors for fiber optic sensors used to measure a level of liquid in a reservoir, such as fuel in a fuel tank of an airplane.

Systems for detecting the level of fuel in a tank or compartment thereof using an optical sensor system are known. In some embodiments, the optical sensor system comprises optical fibers installed inside the fuel tank and a light source (e.g., a laser) and optical detectors (e.g., photodetectors) situated outside the fuel tank. In one proposed implementation, light from the external light source is received by a side-emitting optical fiber inside the fuel tank via an optical fiber connector installed in an opening in the wall of the fuel tank. Similarly, light from a pair of side-receiving optical fibers inside the fuel tank is received by the external optical detectors via respective optical fiber connectors. The optical detectors convert the optical data carried by the light from the side-receiving optical fibers into electrical signals. Those electrical signals are communicated to a computer system (also situated outside the fuel tank). For example, the computer system may be a computer or part of a flight control system located on an aircraft. The computer system may be configured to estimate the amount or level of fuel present in the fuel tank or compartment thereof based on the data carried by light propagating through the optical fiber connectors.

As used herein, the term "optical fiber connector" means a connector that optically couples optical fibers to each other. The principal function of an optical fiber connector is to hold a terminal portion of an optical fiber such that the core of the fiber is axially aligned with the optical path of the optical fiber component to which the connector is mated, e.g., so that light from the one optical fiber is optically coupled to another optical fiber. Some optical fiber connectors are designed to mate a terminal portion of one optical fiber with a terminal portion of another optical fiber. To minimize Fresnel loss, the termini of the respective optical fibers should be in physical contact. Typically optical connectors include a "ferrule," which is a component for holding one or more optical fibers in a state of physical contact such that the fiber ends are optically coupled. As used herein, the term "ferrule" means an elongated body having an axial bore segment configured to support a segment of an optical fiber.

In cases wherein an optical fiber connector passes through a wall of a fuel tank, the optical fiber connector must be hermetically sealed to prevent fuel vapor or liquid leaking out at the interface of the optical fiber connector and the opening in which the connector is installed. One known hermetic optical fiber connector designed for connecting glass optic fibers (GOF) of a GOF fuel level sensor may experience fiber damage inside the hermetic connector. One prior design used an epoxy or glass seal process to achieve hermeticity, which is unable to withstand a large number of temperature cycles and/or a high-vibration environment. In addition, typical hermetic connectors based on prior art require the whole connector on the fuel tank wall to be replaced if the fiber terminus is damaged. A further consideration in the design of a hermetic optical fiber connector is that a new-generation plastic optical fiber (POF) fuel level sensor will eventually replace the GOF fuel level sensor in the future.

It would be desirable to provide a hermetic optical fiber connector that is not susceptible to optical fiber damage or loss of hermeticity and that can be universally used for both GOF and POF fuel level sensors.

SUMMARY

The subject matter disclosed in some detail below is directed to a hermetic optical fiber connector and methods for fabricating such an optical fiber connector which has both durability and hermeticity. The fabrication process is epoxy free and eliminates the concern of stress from epoxy that may cause fiber breakage and loss of hermeticity due to epoxy delamination. The hermetic optical fiber connector disclosed herein uses a high-reliability fiber soldering process to achieve a hermeticity that is able to withstand harsh aerospace environments such as a large number of temperature cycles and a high-vibration environment. More specifically, hermeticity of the optical fiber connector is achieved by a sequence of high-temperature soldering steps with a proper soldering temperature hierarchy. Successive soldering steps employ successive different solder materials having decreasing melting temperatures, thereby ensuring that the heating process involved in a subsequent soldering steps does not adversely affect solder employed in previous soldering steps during the process of fabricating a bulkhead assembly. The connector's hermeticity does not rely on a seal at the terminus which is inserted into the connector. If the terminus is broken, the connector itself does not need to be changed or replaced on the fuel tank wall; instead the connection may be repaired by replacing or re-terminating the terminus. This solution saves time and labor as compared to replacing the hermetic connector on the fuel tank wall. In addition, the design of the hermetic optical fiber connector proposed herein is universal for both glass optical fiber (GOF) and plastic optical fiber (POF) connections.

While an example optical fiber connector suitable for airplane fuel tank fiber optic sensor applications will be described in some detail, the concepts disclosed herein are equally applicable to systems and methods for measuring a level of liquid in a reservoir, such as a storage tank or other container, using an optical sensor. The level of a liquid is continuously measured in many commercial and military applications. For example, liquid-level sensors are commonly used in the fuel tanks of aircraft, automobiles, and trucks. Liquid-level sensors are also used to monitor liquid levels within storage tanks used for fuel dispensing, wastewater treatment, chemical storage, food processing, etc.

As used herein, the term "soldering" means a process in which two or more items are joined together by melting a filler metal (solder) at the interface between confronting items, the filler metal having a lower melting point than the adjoining metals. In accordance with one embodiment of a soldering system disclosed herein, a first solder material consisting of gold and tin (hereinafter "gold/tin solder") has a first melting temperature, a second solder material consisting of silver and tin (hereinafter "silver/tin solder") has a second melting temperature less than the first melting temperature, and a third solder material consisting of lead and tin (hereinafter "lead/tin solder") has a third melting temperature less than the second melting temperature. These solders are used at successive stages during the process of fabricating a bulkhead assembly suitable for hermetic installation in an opening in a wall of a reservoir, such as a fuel tank.

Although various embodiments of optical fiber devices (e.g., optical fiber connectors) and methods for fabricating optical fiber devices will be described in some detail below, one or more of those embodiments may be characterized by one or more of the following aspects.

One aspect of the subject matter disclosed in detail below is an optical fiber device comprising: a ferrule made of ceramic material (e.g., zirconia) and having a bore along a central axis comprising first and second cavities at opposing ends of the ferrule and a precision micro-bore segment connecting the first and second cavities, wherein the micro-bore segment and the first and second cavities are coaxial; a first layer of a metal on a surface of the first cavity; a second layer of the metal on a surface of the second cavity; a first solder ring disposed in the first cavity and having an opening; a second solder ring disposed in the second cavity and having an opening; and a coated optical fiber stub coated with a layer of the metal, a first portion of the coated optical fiber stub being disposed in the opening of the first solder ring, a second portion of the coated optical fiber stub being disposed in the micro-bore segment of the ferrule, and a third portion of the coated optical fiber stub being disposed in the opening of the second solder ring, wherein the first and second solder rings are made of a first solder material having a first melting temperature. The first portion of the coated optical fiber stub is joined to the first cavity by a fusion of the first solder ring and the first layer of the metal on the surface of the first cavity; the second portion of the coated optical fiber stub is joined to the second cavity by a fusion of the second solder ring and the second layer of the metal on the surface of the second cavity. The optical fiber device further comprises metallization on a center region of an outer surface of the ferrule and a layer of a second solder material applied on the metallization, wherein the second solder material has a second melting temperature lower than the first melting temperature. The regions of the ferrule on opposite sides of the center region are respectively inserted in first and second split sleeves. The optical fiber device further comprises a fiber alignment fixture (made of metal) which is joined to the ferrule by the layer of solder material and a bulkhead fixture (made of metal) which is joined to the fiber alignment fixture by third and fourth solder rings made of a third solder material having a third melting temperature lower than the second melting temperature.

Another aspect of subject matter disclosed in detail below is a method for fabricating an optical fiber device, the method comprising: (a) plating respective surfaces of first and second cavities of a ferrule with a metal, the ferrule being made of ceramic material and having an axial bore comprising the first and second cavities and a micro-bore segment connecting the first and second cavities; (b) coating an optical fiber stub with a layer of the metal to provide a coated optical fiber stub, the optical fiber stub having a length greater than a length of the ferrule; (c) placing a center section of the coated optical fiber stub inside the micro-bore segment with respective end sections of the coated optical fiber stub projecting beyond first and second end faces respectively of the ferrule; (d) placing one end of the coated optical fiber stub in an opening of a first solder ring made of a first solder material having a first melting temperature; (e) placing the first solder ring inside the first cavity; (f) placing another end of the coated optical fiber stub in an opening of a second solder ring made of the first solder material; (g) placing the second solder ring inside the second cavity; (h) soldering the coated optical fiber stub to the surface of the first and second cavities of the ferrule concurrently by heating the first and second solder rings to a temperature equal to or greater than the melting temperature of the first solder material; (i) metallizing a center region of an outer surface of the ferrule; (j) applying a layer of a second solder material on the metallized center region, wherein the second solder material has a second melting temperature lower than the first melting temperature; (k) inserting one end of the ferrule inside a portion of a first split sleeve and inserting another end of the ferrule inside a portion of a second split sleeve to form a ferrule assembly; (l) placing the ferrule assembly inside an opening in a middle section of a bore of a fiber alignment fixture made of metal and having a first external annular protrusion; (m) soldering the ferrule assembly inside the fiber alignment fixture by heating the first external annular protrusion to a degree that a temperature of the layer of the second solder material becomes equal to or greater than the second melting temperature; (n) seating third and fourth solder rings made of a third solder material in respective annular recesses formed adjacent respective end faces of the first external annular protrusion of the fiber alignment fixture, wherein the third solder material has a third melting temperature lower than the second melting temperature; (o) placing the first external annular protrusion of the fiber alignment fixture and third and fourth solder rings inside a bore of a bulkhead fixture made of metal and having a second external annular protrusion and an external flange so that respective end sections of the fiber alignment fixture project beyond first and second end faces respectively of the bulkhead fixture; and (p) soldering the fiber alignment fixture inside the bulkhead fixture to form a bulkhead assembly by heating the second external annular protrusion of the bulkhead fixture to a degree that a temperature of the third and fourth solder rings becomes equal to or greater than the third melting temperature.

A further aspect of subject matter disclosed in detail below is an airplane comprising: a fuel tank having a wall with an opening; a bulkhead assembly hermetically installed in the opening in the wall of the fuel tank; a first optical fiber cable disposed inside the fuel tank and comprising a first terminus inserted in a first cavity at one end of the bulkhead assembly and a first optical fiber that terminates inside the first terminus; and a second optical fiber cable disposed outside the fuel tank and comprising a second terminus inserted in a second cavity at another end of the bulkhead assembly and a second optical fiber that terminates inside the second terminus. The bulkhead assembly comprises: a ferrule having a bore segment; and an optical fiber stub disposed inside the bore segment of the ferrule, a first end face in contact with an end face of the first optical fiber and a second end face in contact with an end face of the second optical fiber for optically coupling the first optical fiber to the second optical fiber.

In accordance with one embodiment, the ferrule is made of ceramic material and has first and second cavities connected by the bore segment, the first and second cavities having respective metal-plated surfaces; the bulkhead assembly further comprises a first solder ring disposed in the first cavity and a second solder ring disposed in the second cavity; and the optical fiber stub further comprises a second portion joined to the first cavity by the first solder ring and a third portion joined to the second cavity by the second solder ring.

Other aspects of optical fiber devices and methods for fabricating optical fiber devices are disclosed and claimed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIGS. 1A through 1F are diagrams representing respective side views of components of a ferrule assembly during successive stages of a universal hermetic connector fabrication process in accordance with one embodiment.

FIGS. 2A through 2F are diagrams showing internal features of the components respectively depicted in FIGS. 1A through 1F. FIGS. 2A, 2E and 2F are sectional views; FIGS. 2B-2D are side views.

FIG. 4A is a diagram representing a perspective view of a ferrule assembly prior to insertion inside a fiber alignment fixture during the universal hermetic connector fabrication process partly depicted in FIGS. 1A-1F.

FIG. 4B is a diagram representing a perspective view of a fiber alignment fixture during soldering of the ferrule assembly (depicted in FIGS. 1F, 2F, and 3F) inside the fiber alignment fixture, which soldering operation is another step of the universal hermetic connector fabrication process partly depicted in FIGS. 1A-1F and 4A.

FIG. 5 is a diagram representing a perspective view of a pair of solder rings not yet placed in annular recesses formed in an annular projection of the fiber alignment fixture following the soldering step depicted in FIG. 4B.

FIG. 6A is a diagram representing a side view of the fiber alignment fixture having the respective solder rings depicted in FIG. 5 seated in respective annular recesses prior to insertion of the fiber alignment fixture inside a bulkhead fixture having a flange, which insertion is another step of the universal hermetic connector fabrication process partly depicted in FIGS. 1A-1F, 4A, 4B, and 5.

Reference will hereinafter be made to the drawings in which similar elements in different drawings bear the same reference numerals.

DETAILED DESCRIPTION

Figure 1D:
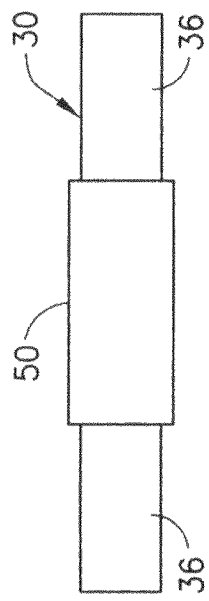
Figure 1E:
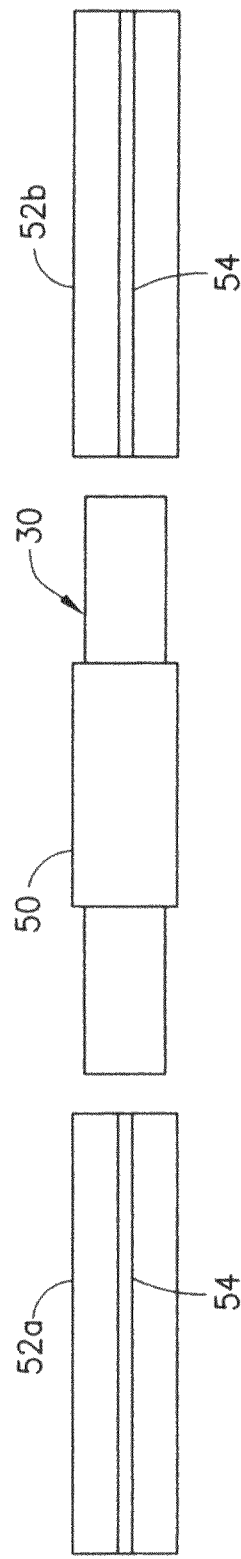
Figure 1F:
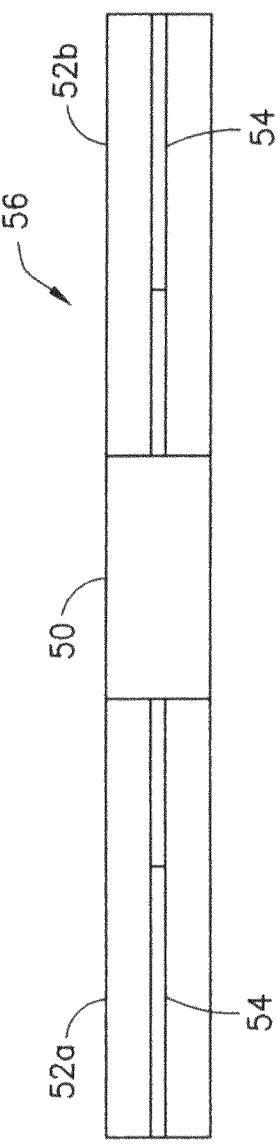

Various embodiments of optical fiber devices (e.g., optical fiber connectors) and methods for fabricating optical fiber devices will now be described in detail for the purpose of illustration. At least some of the details disclosed below relate to optional features or aspects, which in some applications may be omitted without departing from the scope of the claims appended hereto. The disclosed optical fiber device has application in the measurement of the liquid level in a fuel tank of a vehicle (such as an airplane) or in other types of liquid storage containers, including standing structures. Fuel tanks and other liquid storage containers are collectively referred to herein as "reservoirs".

In particular, illustrative embodiments of a hermetic optical fiber connector and a method for its assembly are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIGS. 1A through 1F are diagrams representing respective side views of components of a ferrule assembly during successive stages of a universal hermetic connector fabrication process in accordance with one embodiment. FIGS. 2A through 2F are diagrams showing internal features of the components respectively depicted in FIGS. 1A through 1F. FIGS. 3A through 3F are diagrams representing perspective views of the components respectively depicted in FIGS. 1A through 1F.

The fabrication process starts with a precisely sized ferrule 30 (shown in FIG. 1A) made of ceramic material, such as zirconia. As seen in FIG. 2A, the ferrule 30 has a bore 32 along a central axis comprising first and second cavities 32a and 32b at opposing ends of the ferrule 30 and a micro-bore segment 32c connecting the first and second cavities 32a and 32b. In the example depicted in FIG. 2A, the first and second cavities 32a and 32b are formed by respective cylindrical inner surfaces 40a and 40b and respective conical inner surfaces 42a and 42b of the ferrule 30. The inner diameter of each conical inner surface decreases linearly to a minimum diameter where the conical inner surface intersects with an end of the micro-bore segment 32c. The micro-bore segment 32c (which is sized and shaped to hold an optical fiber) and the first and second cavities 32a and 32b (which are sized and shaped to receive first and second solder rings 34a and 34b shown in FIG. 2D) are coaxial. The ferrule 30 has a cylindrical outer surface 36 and end faces 44a and 44b (best seen in FIG. 3A) which respectively surround the respective openings at the opposing ends of the bore 32 (or more specifically, the openings where the first and second cavities 32a and 32b respectively intersect the end faces 44a and 44b). Preferably, the end faces 44a and 44b are planar annular surfaces oriented perpendicular to the central axis A (shown in FIG. 2A) of the ferrule 30.

The next step in the hermetic optical fiber connector fabrication process is plating the cylindrical inner surfaces 40a and 40b of ferrule 30 with a metal. For the sake of illustration, an example fabrication process that employs specific elements from the periodic table will be described hereinafter. In accordance with such example implementation, the metal plated onto the cylindrical inner surfaces 40a and 40b is gold.

Figure 3A:
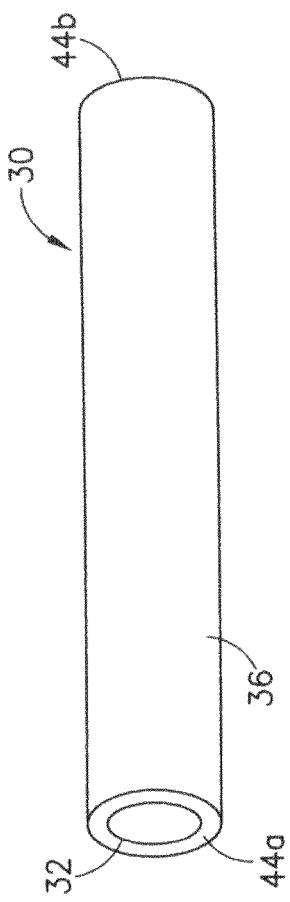
FIGS. 3A through 3F are diagrams representing perspective views of the components respectively depicted in FIGS. 1A through 1F.
Figure 3B:
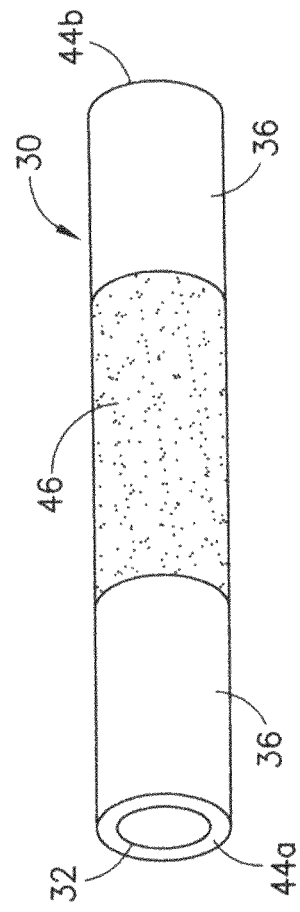

The next step in the fabrication process is to metallize a center region of the cylindrical outer surface 36 of the ferrule 30. The metallization 46 is depicted in FIGS. 1B, 2B and 3B. In accordance with one proposed implementation, the metallization 46 consists of three different layers of metal. The center region of the cylindrical outer surface 36 is first coated with a layer of titanium which adheres to the ceramic surface of the ferrule 30; the layer of titanium is in turn coated with a layer of palladium; finally, the layer of palladium is coated with a layer of gold.

Figure 3C:
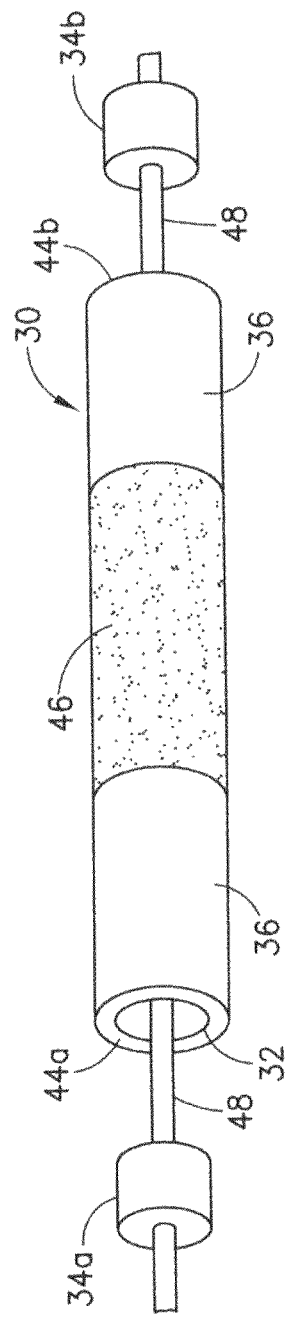

In the next stage of the hermetic optical fiber connector fabrication process, a gold-coated optical fiber stub 48 is inserted into the bore 32 of the ferrule 30, as depicted in FIGS. 1C, 2C and 3C. Preferably, the optical fiber stub is made of glass. The gold-coated optical fiber stub 48 has a length greater than the length of the ferrule 30 so that respective end portions of the gold-coated optical fiber stub 48 project beyond the vertical planes of the end faces 44a and 44b of the ferrule 30, as seen in FIGS. 1C, 2C and 3C. In this state, a middle portion of the gold-coated optical fiber stub 48 is disposed in the micro-bore segment 32c of the ferrule 30, as best seen in FIG. 2C.

In the next step, first and second solder rings 34a and 34b, having openings of diameter slightly greater than the outer diameter of the gold-coated optical fiber stub 48, are respectively slid onto the respective ends of the gold-coated optical fiber stub 48. FIGS. 1C, 2C and 3C depict a state wherein the ends of the gold-coated optical fiber stub 48 have been respectively threaded through the openings of first and second solder rings 34a and 34b, but the first and second solder rings 34a and 34b have not yet been respectively placed inside the first and second cavities 32a and 32b of the ferrule 30.

In accordance with the proposed implementation being used as an example herein, the first and second solder rings 34a and 34b are made of a first solder material consisting of gold and tin (hereinafter "gold/tin solder"). This exemplary gold/tin solder has a melting temperature which is less than the melting temperature of gold (1,063° C.) and greater than the melting temperature of tin (232° C.). For example, the ratio of gold to tin in the gold/tin solder of the first and second solder rings 34a and 34b may be selected so that the melting temperature of the gold/tin solder equal to 320° C.

After the first and second solder rings 34a and 34b have been respectively placed inside the first and second cavities 32a and 32b (not shown in FIG. 2C, but see FIG. 2D), the gold-coated optical fiber stub 48 is soldered to the two gold-plated cylindrical inner surfaces 40a and 40b of the ferrule 30 by a radiofrequency induction heating process at 320° C. (which temperature is high enough to melt the gold/tin solder of the first and second solder rings 34a and 34b). The cooled gold/tin solder holds the gold-coated optical fiber stub 48 (shown in FIG. 2C) securely inside the ferrule 30 with a first portion 48a of the coated optical fiber stub 48 disposed in the first cavity 32a, a second portion 48b of the coated optical fiber stub 48 disposed in the second cavity 32b, and a third portion 48c of the coated optical fiber stub 48 disposed in the micro-bore segment 32c of the ferrule 30.

Figure 3D:
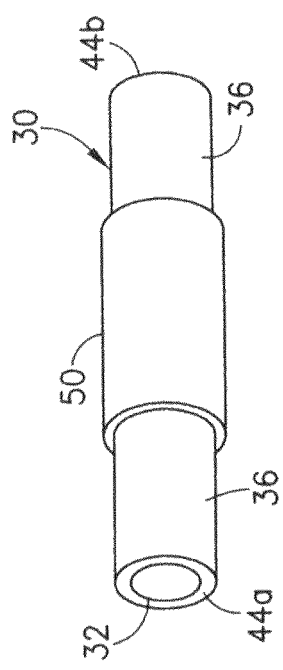
Figure 3E:
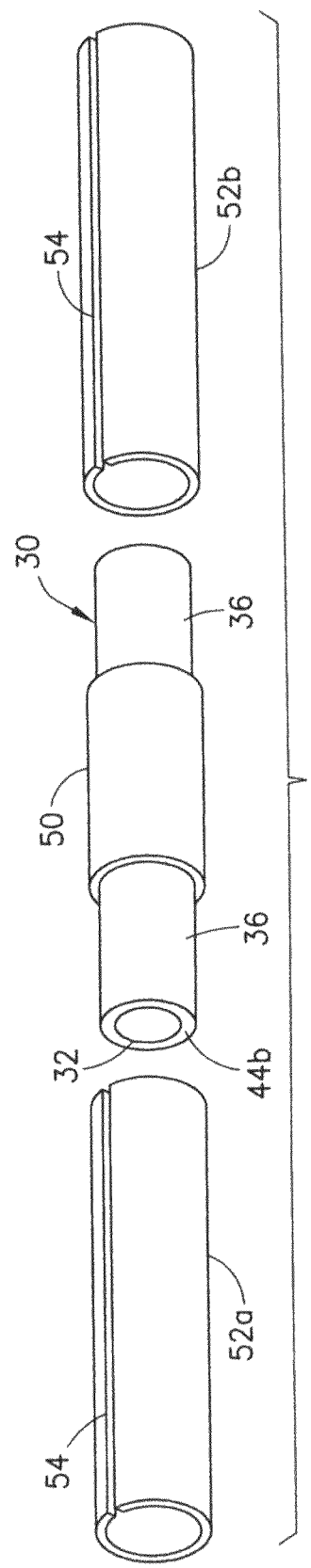
Figure 3F:
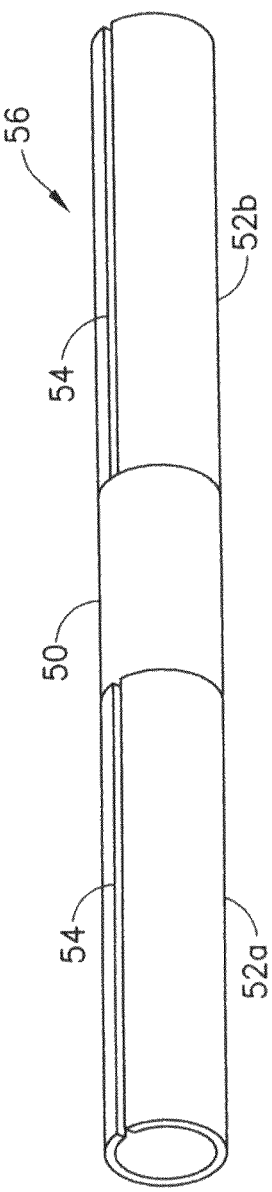

After the gold-coated optical fiber stub 48 has been soldered into the ferrule 30, the respective ends of the gold-coated optical fiber stub 48 are cleaved to be even with the end faces 44a and 44b of the ferrule 30 (not shown in FIG. 2C, but see FIG. 2D). Then the ferrule 30 is dipped in a pot of melted solder material (hereinafter "second solder material") which is different than the first solder material. The immersed ferrule 30 is pulled up slowly. After the second solder material has cooled, the metallized center region on the outside of the ferrule is coated with a thick layer of the second solder material (hereinafter "solder layer 50"). The ferrule 30 with solder layer 50 is commonly referred to as a "pre-tinned ferrule". The pre-tinned ferrule 30 and the end faces of the embedded gold-coated optical fiber stub 48 are then cleaned. The state of the ferrule 30 following cleaving of the fiber ends, coating with the second solder material, and cleaning is shown in FIGS. 1D, 2D and 3D.

In accordance with the proposed soldering materials used in the example implementation being described, the second solder material consists of silver and tin (hereinafter "silver/tin solder"). This exemplary silver/tin solder has a melting temperature which is less than the melting temperature of silver (961° C.) and less than the melting temperature of tin (232° C.). The melting temperature of the silver/tin solder is also less than the melting temperature of the gold/tin solder. The ratio of silver to tin in the silver/tin solder may be selected so that the melting temperature of the silver/tin solder is about 220° C. In specific proportions, some alloys can become eutectic—that is, the alloy's melting point is lower than the melting point of either component. For example, a eutectic alloy consisting of 3.5 wt. % silver and 96.5 wt. % tin has a melting point of 221° C.

In the next stage of the hermetic optical fiber connector fabrication process, two alignment split sleeves 52a and 52b (shown in FIGS. 1E, 2E and 3E) are prepared. The alignment split sleeves 52a and 52b are circular cylindrical tubes made of ceramic material (such as zirconia) or bronze. Each alignment split sleeve is provided with a single longitudinal slit 54 that extends the entire length of the sleeve. The portions of the ferrule on opposite sides of the solder layer 50 are then inserted into the respective alignment split sleeves 52a and 52b to form the completed ferrule assembly 56 depicted in FIGS. 1F, 2F, and 3F.

The next stage of the connector fabrication process is shown in FIGS. 4A and 4B. FIG. 4A shows the ferrule assembly 56 prior to insertion inside a fiber alignment fixture 60 made of metal. In accordance with some proposed implementations, the fiber alignment fixture 60 may be made of copper, tungsten or Kovar. Kovar is a nickel-cobalt ferrous alloy having a composition designed to have substantially the same thermal expansion characteristics as borosilicate glass to allow a tight mechanical joint between the two materials over a range of temperatures.

Figure 6B:
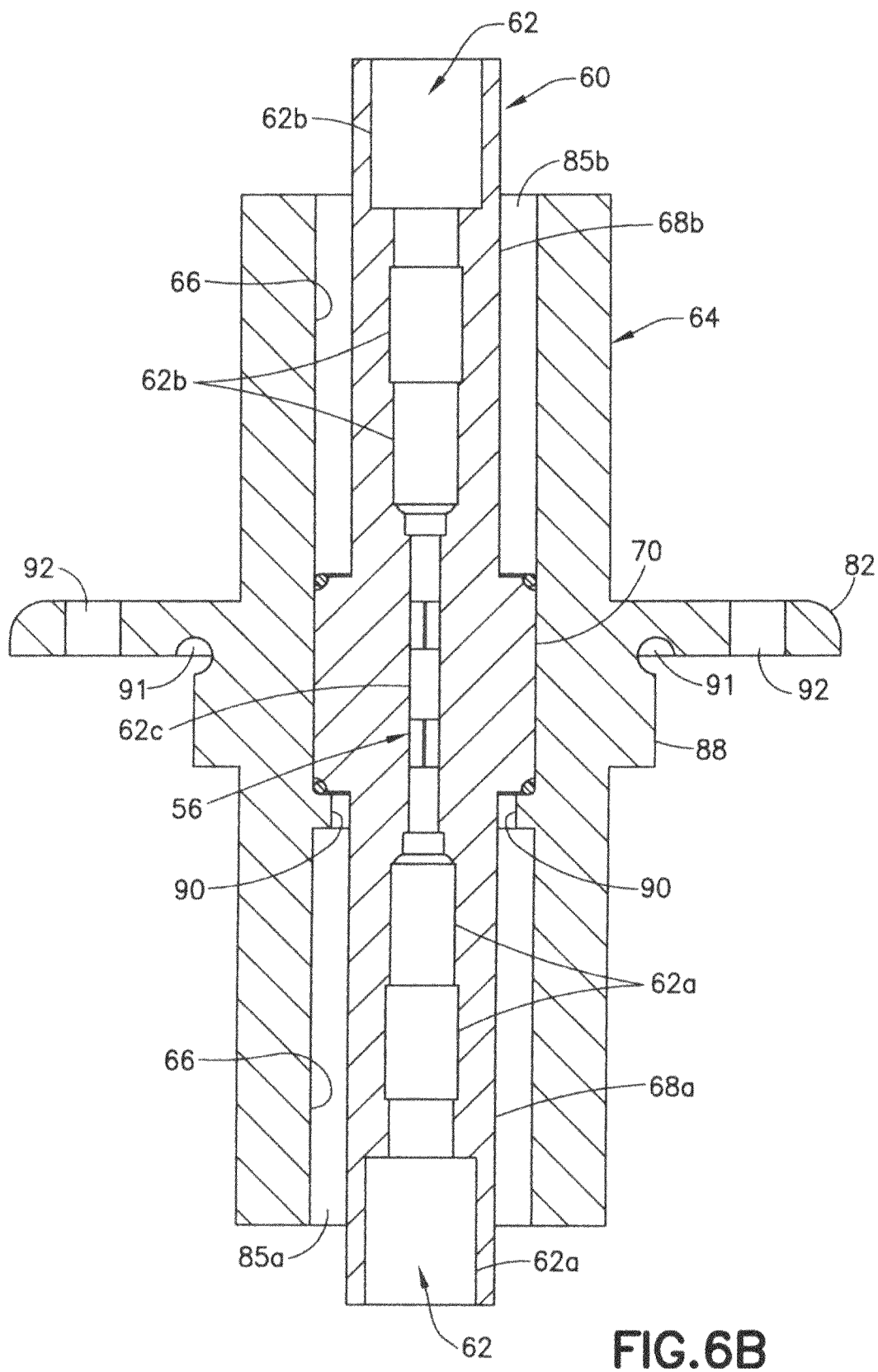
FIG. 6B is a diagram representing a partial sectional view of the fiber alignment fixture after insertion into the bulkhead fixture depicted in FIG. 6A, thereby forming a bulkhead assembly suitable for installation in an opening in a fuel tank wall.

As seen in the partial sectional view of FIG. 6B, the fiber alignment fixture 60 has a bore 62 along a central axis. The bore 62 comprises first and second cavities 62a and 62b at opposing ends of the fiber alignment fixture 60 and a micro-bore segment 62c connecting the first and second cavities 62a and 62b. The micro-bore segment 62c (which is sized and shaped to hold the ferrule assembly 56) and the first and second cavities 62a and 62b (which are sized and shaped to receive first and second termini 80a and 80b seen in FIG. 10) are coaxial. The micro-bore segment 62c is disposed in a middle section of the fiber alignment fixture 60 and has interior features designed to hold the ferrule assembly 56 in the middle position for soldering.

Referring again to FIG. 4A, the fiber alignment fixture 60 has an external annular protrusion 70 in a middle section and circular cylindrical outer surfaces 68a and 68b on opposite sides of the external annular protrusion 70. For reasons to be explained below, a pair of annular recesses 78a and 78b are formed at the respective circumferential corners of the external annular protrusion 70. The fiber alignment fixture 60 also has end faces 72a and 72b (best seen in FIG. 4A) which respectively surround the respective openings at the opposing ends of the bore 62 (or more specifically, the openings where the first and second cavities 62a and 62b of bore 62 respectively intersect the end faces 72a and 72b). Preferably, the end faces 72a and 72b are planar annular surfaces oriented perpendicular to the central axis B of the fiber alignment fixture 60 (which is coaxial with the central axis A of the ferrule 30 seen in FIG. 2A).

After the ferrule assembly 56 has been inserted in the micro-bore segment 62c of the fiber alignment fixture 60, the fixture and assembly are joined by a soldering operation in which the solder layer 50 is melted and then cooled. This soldering operation is another step of the universal hermetic connector fabrication process partly depicted in FIGS. 3A-3F and 4A.

FIG. 4B is a diagram representing a perspective view of the fiber alignment fixture 60 during soldering of the ferrule assembly 56 inside the fiber alignment fixture 60. The external annular protrusion 70 of the fiber alignment fixture 60 is clamped with a pair of tweezers 74a and 74b. The tweezers 74a and 74b are then heated to a degree that a temperature of the solder layer 50 becomes equal to or greater than the melting temperature of the silver/tin solder. In one proposed implementation, the silver/tin solder of solder layer 50 is heated to a temperature higher than the melting temperature of the silver/tin solder (e.g., above 221° C.). As the silver/tin solder is cooled and solidified, the ferrule assembly 56 becomes joined to the internal midsection of the fiber alignment fixture 60.

In the next stage of the connector fabrication process, the fiber alignment fixture 60 (with ferrule assembly 56 inside) is readied for insertion into a bulkhead fixture 64 seen in isolation in the side view of FIG. 6A. The first step in the process of installing the fiber alignment fixture 60 in the bulkhead fixture 64 involves the placement of third and fourth solder rings 58a and 58b in the respective annular recesses 78a and 78b of the external annular protrusion 70. FIG. 5 shows the third and fourth solder rings 58a and 58b not yet placed in the annular recesses 78a and 78b.

In accordance with the proposed implementation being used as an example here, the third and fourth solder rings 58a and 58b are made of a third solder material consisting of lead and tin (hereinafter "lead/tin solder"). This exemplary lead/tin solder has a melting temperature which is less than the melting temperature of lead (327° C.) and less than the melting temperature of tin (232° C.). For example, the ratio of lead to tin in the lead/tin solder of the third and fourth solder rings 58a and 58b may be selected so that the melting temperature of the lead/tin solder is about 180° C. For example, a eutectic alloy consisting of 63 wt. % lead and 37 wt. % tin has a melting point of 183° C.

FIG. 6A is a diagram representing a side view of the fiber alignment fixture 60 prior to insertion of the fiber alignment fixture 60 inside a bore 66 formed in the bulkhead fixture 64. The fiber alignment fixture 60 has the third and fourth solder rings 58a and 58b seated in the respective annular recesses 78a and 78b. The bulkhead fixture 64 is made of metal (e.g., nickel-plated aluminum). The structure of bulkhead fixture 64 includes a mounting flange 82 with through holes 92 by which the bulkhead fixture 64 may be attached to a wall of a fuel tank or other reservoir. The bulkhead fixture 64 also has an external annular protrusion 88 disposed adjacent to the mounting flange 82. The external annular protrusion 88 has a circular circumferential surface that will be seated in a circular opening 5 when the completed optical fiber connector is installed in the wall 3 (see FIG. 8 of a fuel tank 2 (see FIG. 14). The bulkhead fixture 64 has an annular groove 91 for receiving a silicone rubber gasket (not shown in FIG. 6B, but see silicone rubber gasket 76a in FIGS. 8 and 9).

Figure 8:
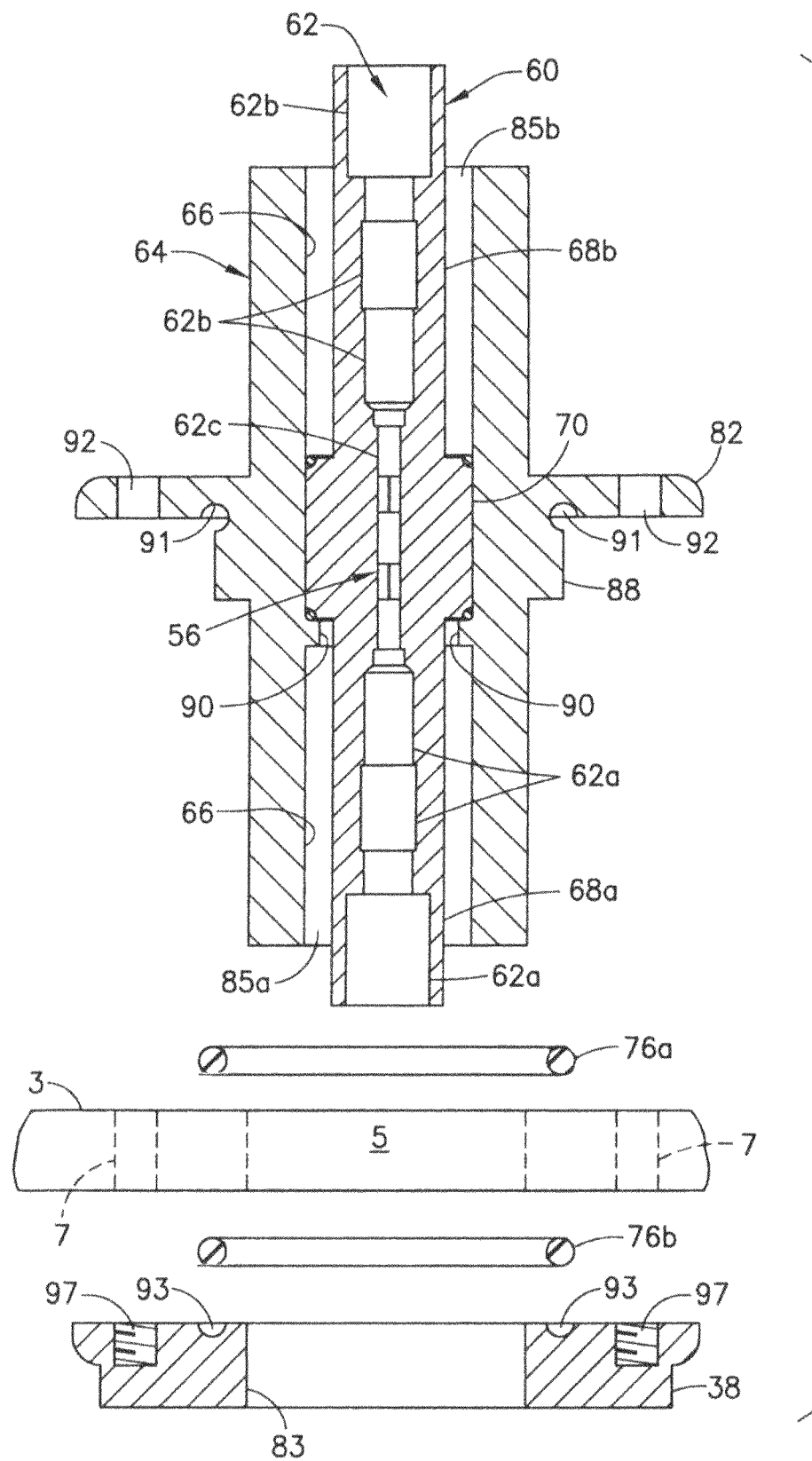
FIG. 8 is a hybrid diagram representing a partly exploded view of components of a universal hermetic optical fiber connector prior to installation in an opening in a fuel tank wall, which components include the post-soldering bulkhead assembly, two silicone rubber gaskets, and an outside mounting flange shown in section.
Figure 9:
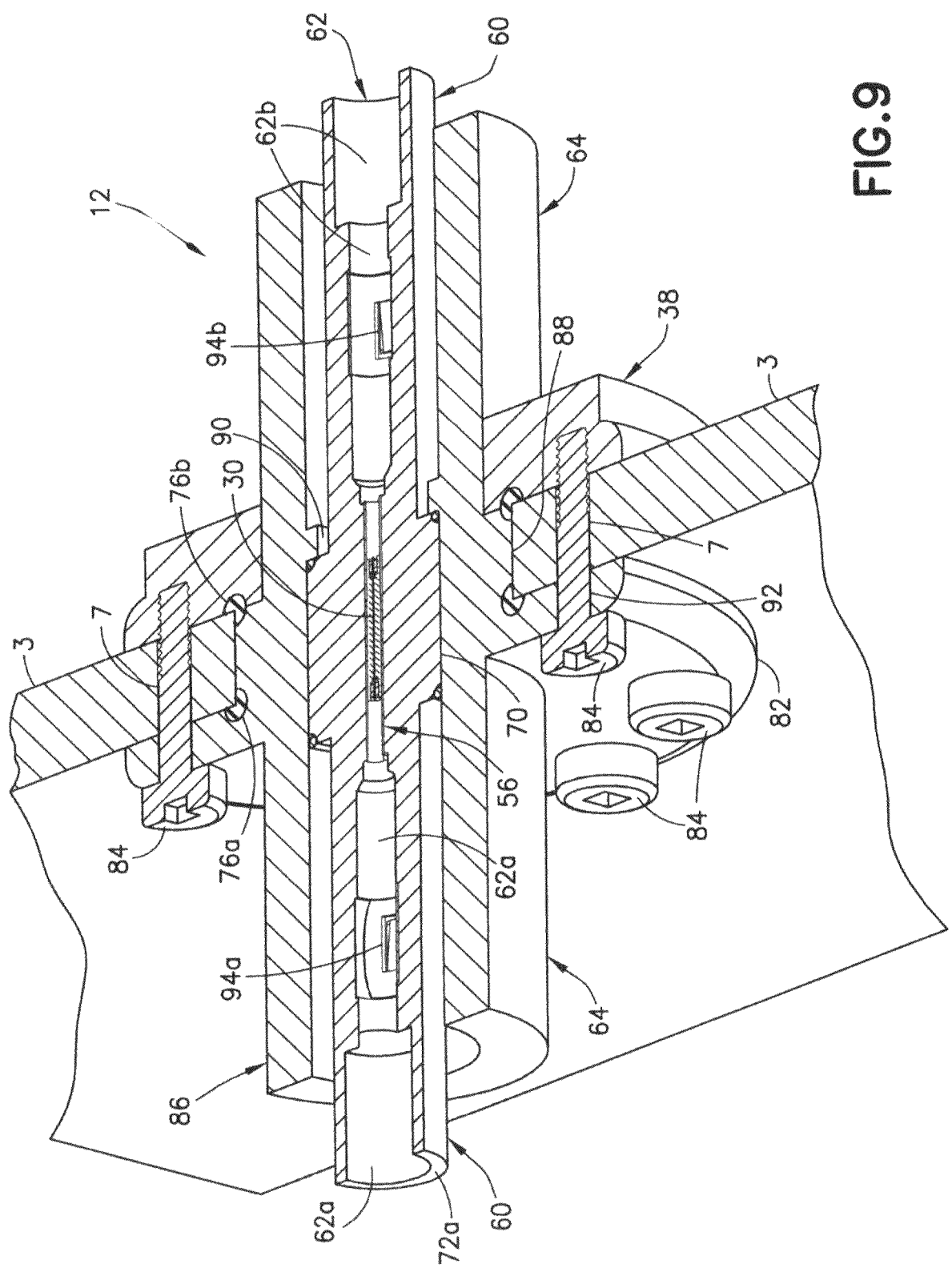
FIG. 9 is a diagram representing a perspective sectional view of the installed universal hermetic optical fiber connector following the insertion of terminus retaining clips inside the fiber alignment fixture.

FIG. 6B is a diagram representing a partial sectional view of the fiber alignment fixture 60 after insertion into the bulkhead fixture 64 depicted in FIG. 6A, thereby forming a bulkhead assembly 86 suitable for installation in a wall 3 of a fuel tank 2 and other reservoir as shown in FIG. 9. As seen in FIG. 6B, the bulkhead fixture 64 has an internal structure that includes a circular cylindrical bore 66 having an internal diameter slightly greater than the outer diameter of the external annular protrusion 70 of the fiber alignment fixture 60. When the fiber alignment fixture 60 and bulkhead fixture are joined by soldering, respective annular gaps 85a and 85b are formed between the bore 66 of the bulkhead fixture 64 and the respective circular cylindrical outer surfaces 68a and 68b of the fiber alignment fixture 60. The internal structure of the bulkhead fixture 64 further includes an internal annular protrusion 90 which projects radially inward and acts as a stop to prevent further axial travel of the fiber alignment fixture 60 when an annular side face of the external annular protrusion 70 abuts the confronting annular side face of the internal annular protrusion 90, which state of abutment is depicted in FIG. 6B (and in FIGS. 7 and 8 as well).

When the fiber alignment fixture 60 (with solder rings) is correctly positioned inside the bulkhead fixture 64 as seen in FIG. 6B, the third solder ring 58a is disposed between the internal annular protrusion 90 of the bulkhead fixture 64 and the external annular protrusion 88 of the fiber alignment fixture 60, while the fourth solder ring 58b (still seated in the annular recess 78b of the fiber alignment fixture 60) is in contact with the interior wall of the bore 66 of the bulkhead fixture 64. With the correct positional relationship established, the fiber alignment fixture 60 and bulkhead fixture 64 are ready to be joined by first melting and then solidifying the third and fourth solder rings 58a and 58b.

Figure 7:
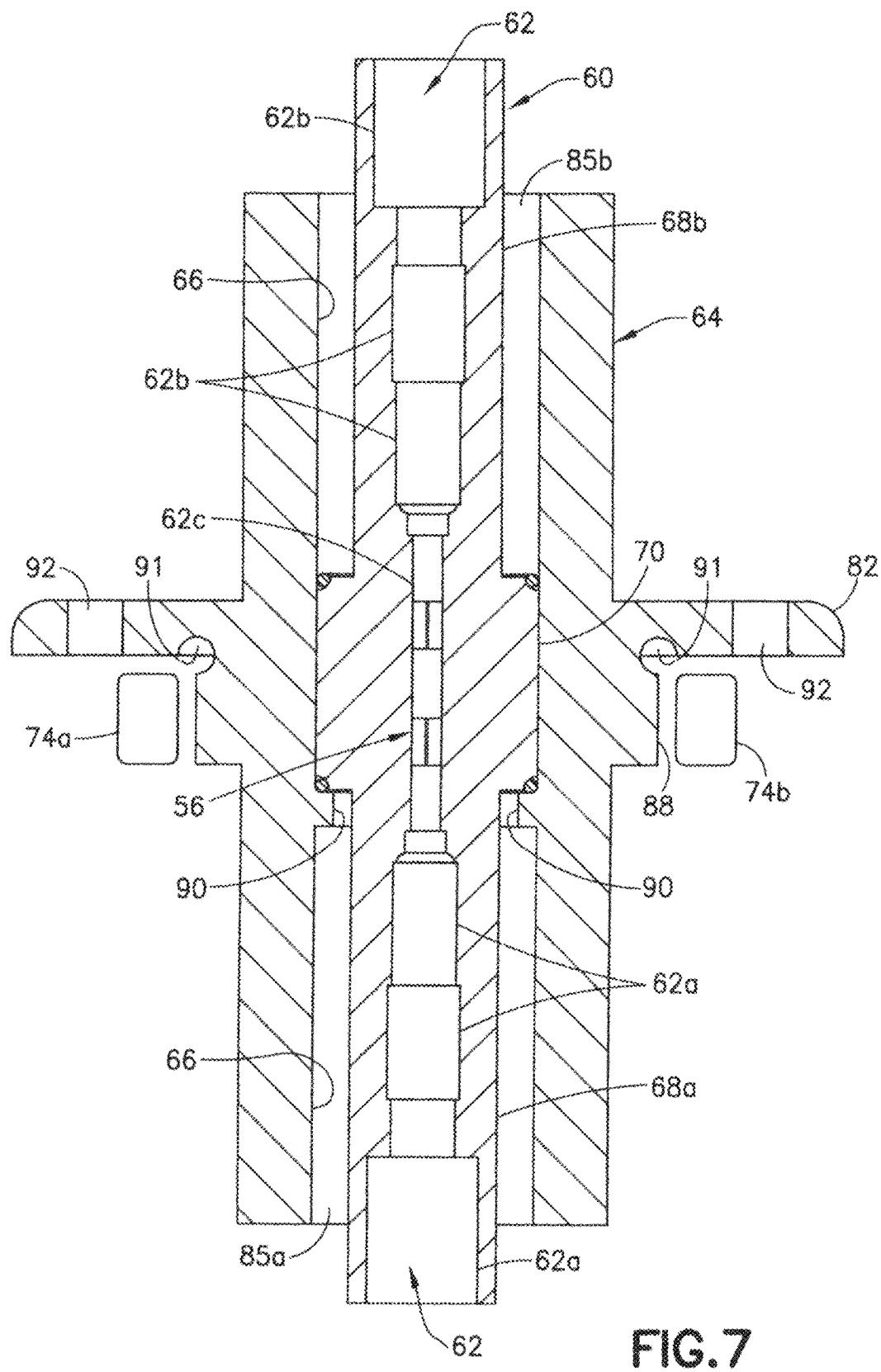
FIG. 7 is a diagram representing a partial sectional view of the fiber alignment fixture joined to the bulkhead fixture and during a soldering operation which is another step of the universal hermetic connector fabrication process partly depicted in FIGS. 1A-1F, 4A, 4B, 5, and 6A.

FIG. 7 is a diagram representing a partial sectional view of the fiber alignment fixture 60 inside the bulkhead fixture 64 during a soldering operation. The external annular protrusion 88 of the bulkhead fixture 64 is clamped with a pair of tweezers 74a and 74b. The tweezers 74a and 74b are then heated to a degree that temperatures of the third and fourth solder rings 58a and 58b become equal to or greater than the melting temperature of the lead/tin solder. In one proposed implementation, the lead/tin solder of the third and fourth solder rings 58a and 58b is heated to a temperature higher than the melting temperature of the lead/tin solder (e.g., higher than 183° C.). As the lead/tin solder is cooled and solidified, the fiber alignment fixture 60 becomes joined to the bulkhead fixture 64 to form the bulkhead assembly 86.

In the next stage of the connector fabrication process, the bulkhead assembly 86 is readied for installation into the wall of a fuel tank. FIG. 8 is a hybrid diagram representing a partly exploded view of components of a universal hermetic optical fiber connector prior to installation in an opening 5 in a fuel tank wall 3, which components include the bulkhead assembly 86 shown in section. From inside of the fuel tank, the bulkhead assembly 86 is first passed through a silicone rubber gasket 76a and then through the opening 5 in the fuel tank wall 3. On the outside of the fuel tank, another silicone rubber gasket 76b is placed around the portion of the bulkhead assembly 86 that projects outside the fuel tank. Then a mounting flange 38 (made of metal and having threaded holes) is placed around the outwardly projecting portion of the bulkhead assembly 86.

As seen in FIG. 8, the mounting flange 38 has a circular cylindrical bore 83 for receiving the bulkhead fixture 64, an annular groove 93 for receiving a portion of silicone rubber gasket 76b, and a plurality of threaded holes 97 for receiving threaded shafts of respective clamping screws (not shown in FIG. 8, but see clamping screws 84 shown in FIG. 9). After the threaded holes 97 of the mounting flange 38 and the through holes 92 of the mounting flange 82 have been aligned with corresponding through holes formed in the fuel tank wall 3, the threaded portions of the shafts of the clamping screws 84 (see FIG. 9) are screwed into the threaded holes 97 of mounting flange 38 to clamp the bulkhead assembly 86 to the fuel tank wall 3.

FIG. 9 is a diagram representing a perspective sectional view of the installed universal hermetic optical fiber connector 12. When the threaded holes in the mounting flanges are aligned with the through holes in the fuel tank wall 3, clamping screws 84 are passed through the aligned holes. The mounting flange 38 and mounting flange 82 are tightened together to the fuel tank wall 3 by the set of clamping screws 84. The silicone rubber gaskets 76a and 76b hermetically seal the bulkhead assembly 86 to the opening 5 in the fuel tank wall 3.

Still referring to FIG. 9, the next step of the hermetic optical fiber connector fabrication process is to place two terminus retaining clips 94a and 94b inside the bore 62 of the fiber alignment fixture 60. One terminus retaining clip 94a is placed in the first cavity 62a of the bore 62; the other terminus retaining clip 94b is placed in the second cavity 62b of the bore 62. The bore 62 has built-in mechanical features to retain the terminus retaining clips 94a and 94b inside the fiber alignment fixture 60.

Figure 10:
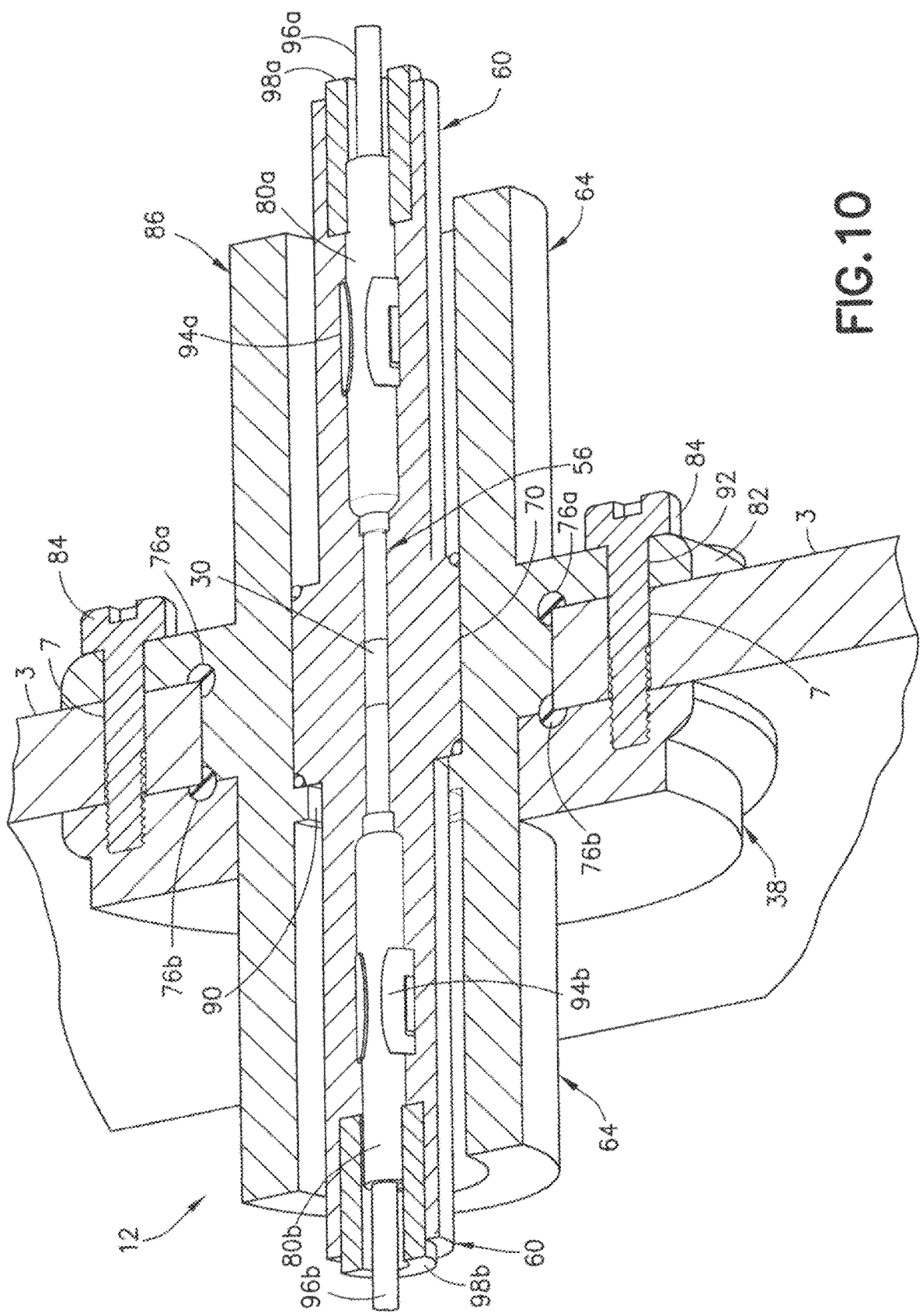
FIG. 10 is a diagram representing a perspective partial sectional view of the installed universal hermetic optical fiber connector following the insertion of respective termini into opposite ends of the fiber alignment fixture, one terminus terminating an optical fiber cable disposed inside the fuel tank and the other terminus terminating an optical fiber cable disposed outside the fuel tank.
Figure 11:
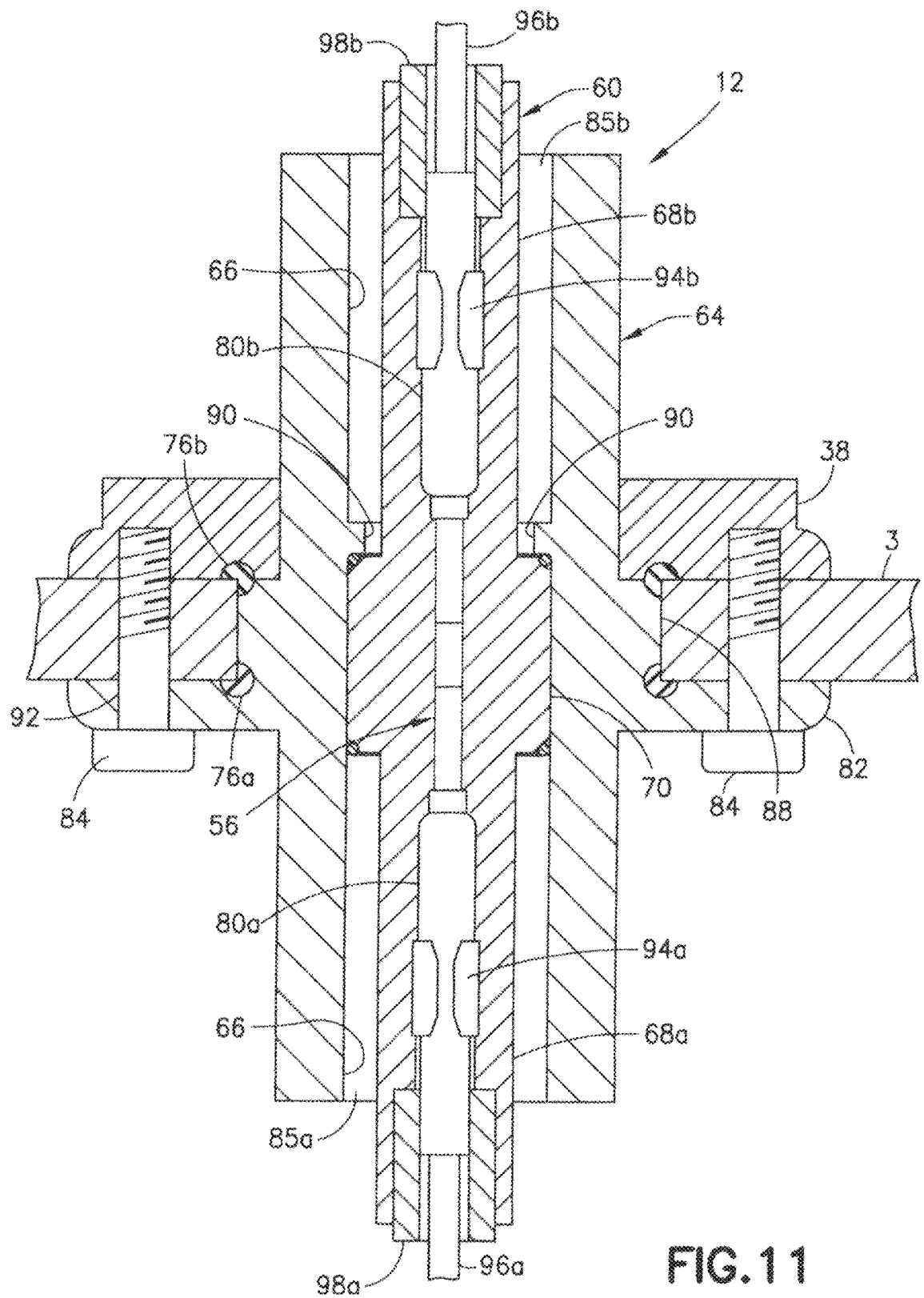
FIG. 11 is a diagram representing a partial sectional view of a completed universal hermetic optical fiber connector mounted on a fuel tank wall, including internal and external optical fiber cables which are optically coupled to each other via the optical fiber stub seen in FIGS. 2D-2F.

After the terminus retaining clips 94a and 94b have been placed inside the fiber alignment fixture 60, an insertion tool is used to insert two termini into opposite ends of the hermetic optical fiber connector 12. FIG. 10 is a diagram representing a perspective partial sectional view of the installed hermetic optical fiber connector 12 following the insertion of respective termini 80a and 80b into opposite ends of the fiber alignment fixture 60. FIG. 11 is a sectional top view of the universal hermetic optical fiber connector 12 mounted on the fuel tank wall 3. As seen in FIGS. 10 and 11, one terminus 80a terminates an optical fiber cable 96a disposed outside the fuel tank and the other terminus 80b terminates an optical fiber cable 96b disposed inside the fuel tank. The termini 80a and 80b are respectively retained by the terminus retaining clips 94a and 94b. When the termini 80a and 80b are fully inserted as depicted in FIG. 10, the end faces of the optical fibers (which may be made of glass or plastic) of the optical fiber cables 96a and 96b are optically coupled by the optical fiber stub 48 (shown in FIG. 2D) inside the ferrule assembly 56 (shown in FIG. 2F). The installation of the optical fiber connector 12 is completed by inserting respective rubber boots 98a and 98b at each of the fiber alignment fixture 60, which rubber boots 98a and 98b respectively slide onto the ends of the termini 80a and 80b to provide support. Optionally, each rubber boot 98a and 98b has a bore consisting of two circular cylindrical channels which are axially aligned, but have different inner diameters. The first circular cylindrical channel has an inner diameter which is slightly greater than the outer diameter of the jacketed portion of the optical fiber cable; the second circular cylindrical channel has an inner diameter which is slightly greater than the outer diameter of the end of the terminus.

Figure 12A:
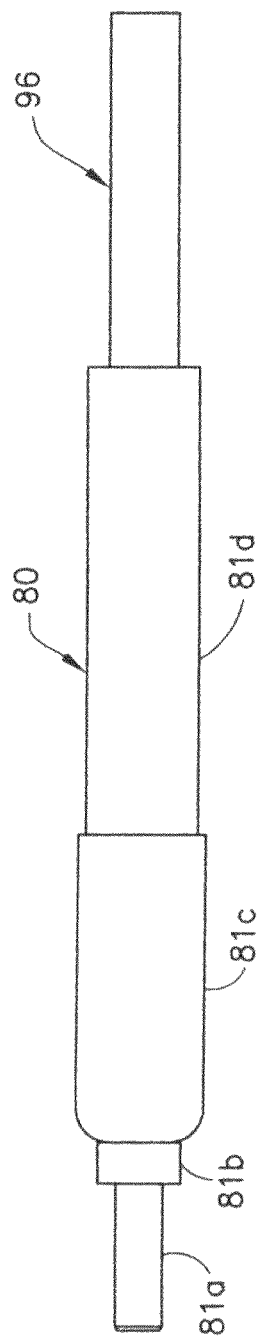
FIG. 12A is a diagram representing a side view of an ARINC 801 (A801) terminus.
Figure 12B:
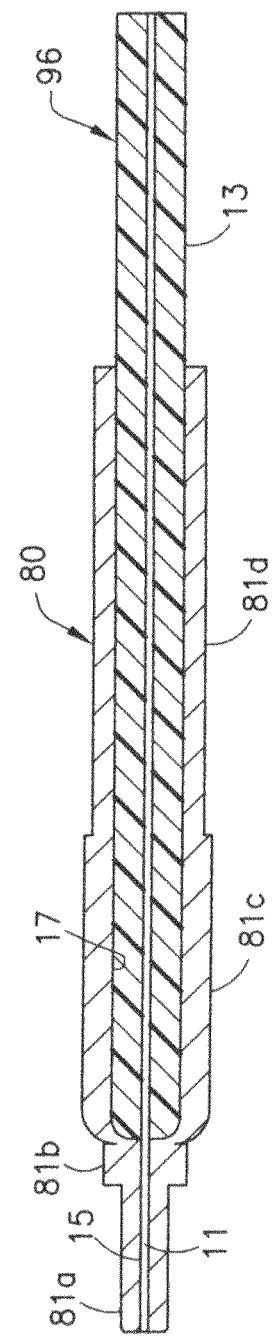
FIG. 12B is a diagram representing a side view showing internal features of the A801 terminus depicted in FIG. 12A.

In accordance with one proposed implementation for use in a fuel tank of an airplane, each terminus may be an ARINC 801 (A801) terminus 80 of the type depicted in FIGS. 12A and 12B. The A801 terminus 80 is made of metal and has a monolithic structure with respective terminus sections 81a-81d of different outer diameters.

FIG. 12A is a diagram representing a side view of an A801 terminus 80 that terminates an optical fiber cable 96. The terminus section 81a has a first outer diameter that enables terminus section 81a to fit snugly inside a split sleeve 52a or 52b of the ferrule assembly 56. The terminus sections 81b and 81c are configured to fit inside the first cavity 62a or second cavity 62b of the fiber alignment fixture 60, which cavity has respective sections with different inner diameters that match the outer diameters of terminus sections 81b and 81c. The terminus section 81d has an outer diameter which is less than the outer diameter of the terminus section 81c, which allows a terminus retainer clip (e.g., terminus retaining clip 94a or 94b seen in FIG. 9) to effectively latch the A801 terminus 80 in place.

FIG. 12B is a diagram representing a side view showing internal features of the A801 terminus 80 depicted in FIG. 12A. The terminus sections 81a and 81b each have a micro-bore segment 15 sized to receive the unjacketed optical fiber 11 of the optical fiber cable 96. The terminus sections 81c and 81d each have a circular cylindrical bore segment 17 sized to receive the portion of the optical fiber cable 96 having a jacket 13.

Each optical fiber is a flexible, optically transparent or translucent fiber made of extruded glass or plastic. The optical fiber can function as a waveguide or light pipe to transmit light between the two ends of the fiber. The term "optical fiber" as used herein refers to a cylindrical dielectric waveguide that transmits light along its axis. The fiber consists of a transparent core surrounded by a transparent cladding layer (hereinafter "cladding"), both of which are made of dielectric materials. Light is kept in the core by the phenomenon of total internal reflection. To confine the optical signal in the core, the refractive index of the core is greater than that of the cladding. The boundary between the core and cladding may either be abrupt, as in step-index fiber, or gradual, as in graded-index fiber. The hermetic optical fiber connector disclosed herein is universal in the sense that the connector is able to optically couple either glass optical fibers or plastic optical fibers.

The description of one embodiment presented above includes identification of exemplary materials. Other material selections are acceptable if compatible with the connector's high-temperature soldering processes. To generalize the optical fiber connector fabrication process without specifying materials, a method for fabricating an optical fiber device in accordance with one embodiment will now be described with reference to the flowchart presented in FIGS. 13A and 13B.

Figure 13A:
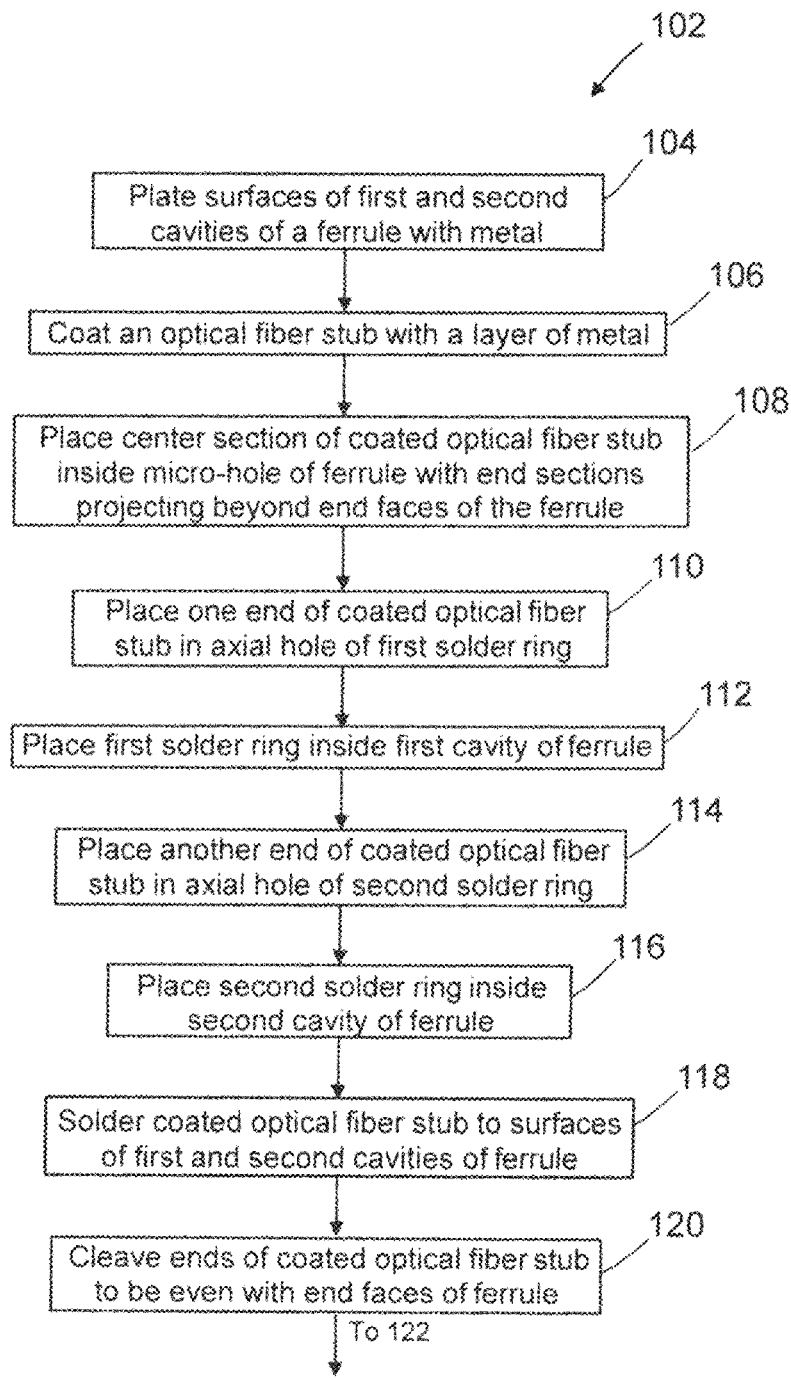
FIGS. 13A and 13B are respective portions of a flowchart identifying steps of a universal hermetic connector fabrication process in accordance with one embodiment.
Figure 13B:
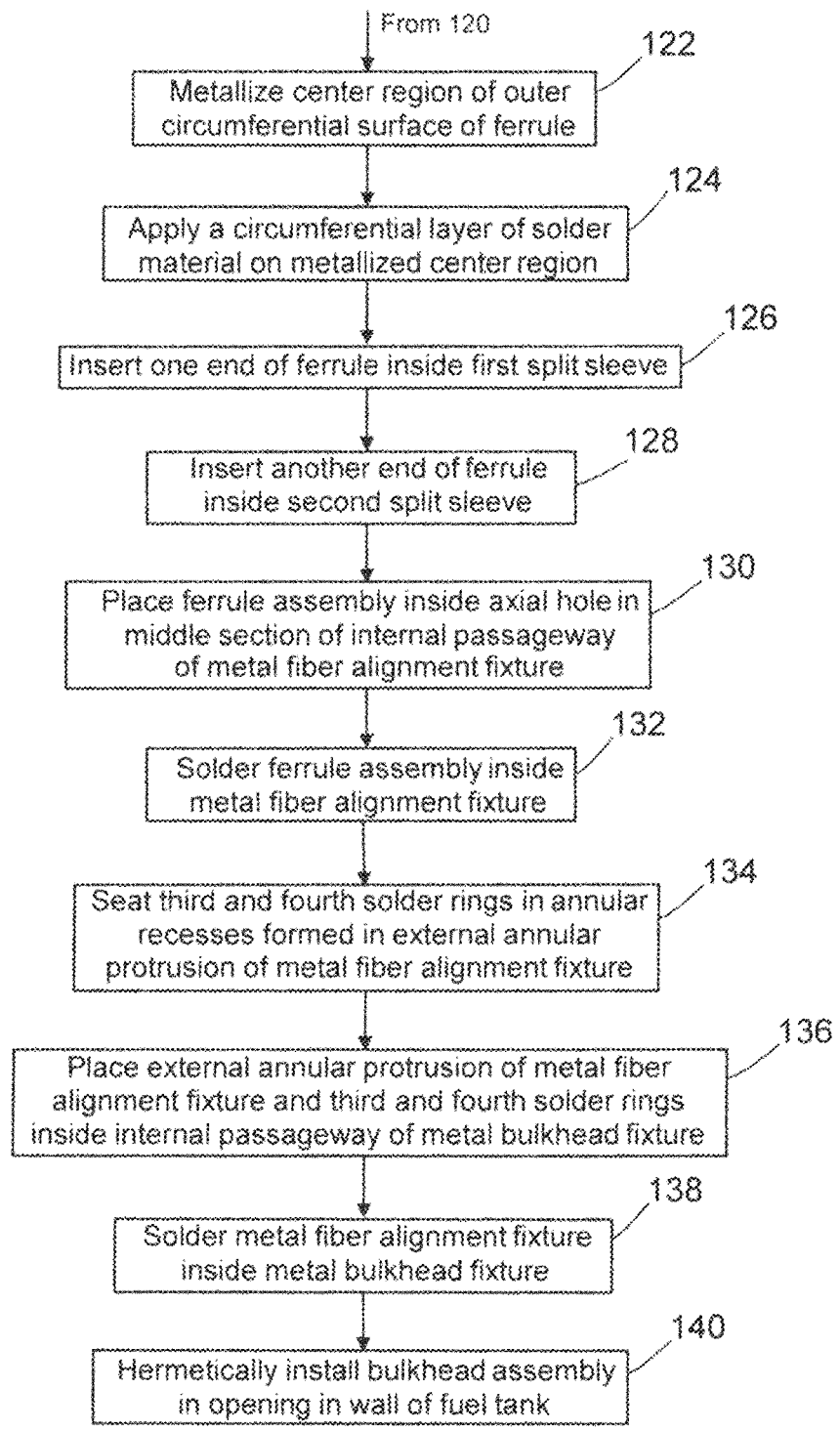

Referring to FIG. 13A, the first step in the fabrication method 102 is to plate respective surfaces of first and second cavities of a ferrule with a metal (step 104). In addition, an optical fiber stub is coated with a layer of the metal to provide a coated optical fiber stub, the optical fiber stub having a length greater than a length of the ferrule (step 106). Then a center section of the coated optical fiber stub is placed inside a micro-bore segment of the ferrule with respective end sections of the coated optical fiber stub projecting beyond first and second end faces respectively of the ferrule (step 108). After step 108, one end of the coated optical fiber stub is placed in an opening of a first solder ring made of a first solder material having a first melting temperature (step 110). The first solder ring is then placed inside the first cavity of the ferrule (step 112). Similarly, the other end of the coated optical fiber stub is placed in an opening of a second solder ring made of the first solder material (step 114). The second solder ring is then placed inside the second cavity (step 116). Then the coated optical fiber stub is soldered to the surfaces of the first and second cavities of the ferrule by RF induction heating the first and second solder rings to a temperature greater than the melting temperature of the first solder material (step 118). After the optical fiber stub has been soldered inside the ferrule, the opposing ends of the coated optical fiber stub are cleaved even with the respective end faces of the ferrule (step 120). Then a center region of an outer surface of the ferrule is metallized (step 122). Following metallization, a circumferential layer of a second solder material is applied on the metallized center region, which second solder material has a second melting temperature lower than the first melting temperature of the first solder material (step 124). Following application of the second solder material, one end of the ferrule is inserted inside a first portion of a first split sleeve (step 126) (a second portion of the first split sleeve will receive a portion of a first terminus) and another end of the ferrule is inserted inside a first portion of a second split sleeve (step 128) (a second portion of the second split sleeve will receive a portion of a second terminus) to form a ferrule assembly. The ferrule assembly is then placed inside an opening in a middle section of a bore of a fiber alignment fixture made of metal (step 130). Then the ferrule assembly is soldered inside the fiber alignment fixture by heating an external annular protrusion of the fiber alignment fixture to a degree that a temperature of the layer of the second solder material becomes equal to or greater than the second melting temperature (step 132). After the ferrule assembly has been soldered inside the fiber alignment fixture, third and fourth solder rings made of a third solder material are seated in respective annular recesses formed adjacent to respective end faces of the external annular protrusion of the fiber alignment fixture (step 134). The third solder material has a third melting temperature lower than the second melting temperature. Then the external annular protrusion of the fiber alignment fixture and the third and fourth solder rings are placed inside a bore of a bulkhead fixture made of metal (step 136). Then the fiber alignment fixture is soldered inside the bulkhead fixture to form a bulkhead assembly by heating an external annular protrusion of the bulkhead fixture to a degree that a temperature of the third and fourth solder rings becomes equal to or greater than the third melting temperature (step 138). The resulting bulkhead assembly is then hermetically installed in an opening formed in a wall of a fuel tank or other reservoir (step 140).

Figure 14:
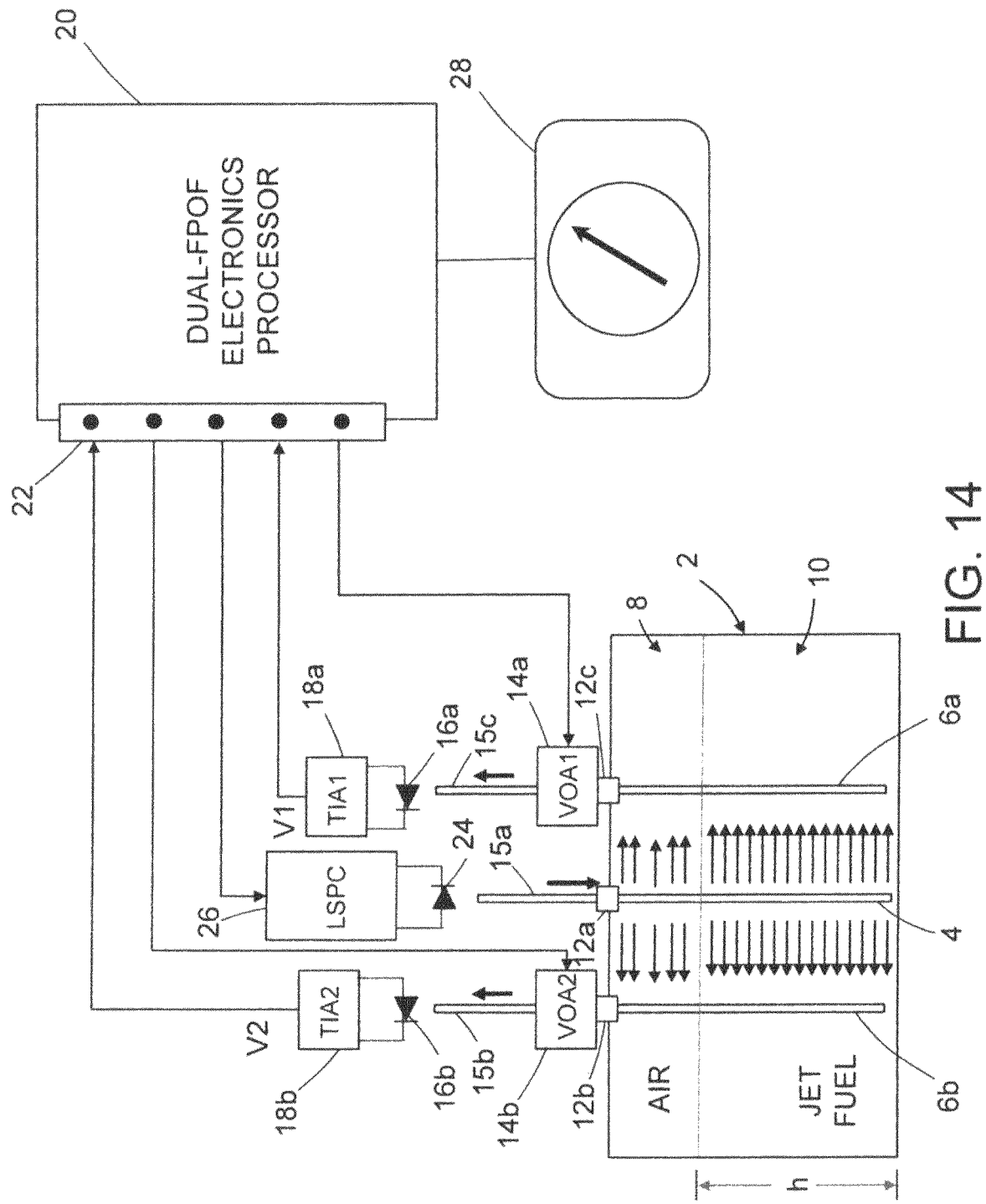
FIG. 14 is a hybrid diagram showing the design of a dual-POF fuel level sensor comprising a light source that supplies light to optical fibers inside a fuel tank via a first universal hermetic optical fiber connector of the type disclosed herein and further comprising an electronics processor which processes data carried by light received from the optical fibers inside the fuel tank via second and third universal hermetic optical fiber connectors of the type disclosed herein.

For the purpose of illustration, a fuel level measurement system that employs hermetic optical fiber connectors of the type shown in FIGS. 10 and 11 will now be described. FIG. 14 is a hybrid diagram showing the design of a dual-POF fuel level sensor comprising a light source that supplies light to a side-emitting plastic optical fiber (SPOF) 4 inside a fuel tank 2 via a first hermetic optical fiber connector 12a and an electronics processor 20 which processes data carried by light received from two fluorescent plastic optical fibers (FPOF) 6a and 6b inside the fuel tank 2 via second and third hermetic optical fiber connectors 12c and 12b respectively. The light emitted by the SPOF 4 is indicated by arrows in FIG. 14

In the example shown in FIG. 14, optical fibers 4, 6a and 6b are used to measure the level h of fuel in a fuel tank 2. In other embodiments, the same apparatus may be used to detect other liquids. For example, the system described above may be used to detect the presence of water in a container or hydraulic fluids in a reservoir for a hydraulic system. The illustration of detecting fuel in a fuel tank is presented for purposes of illustration and not meant to limit the manner in which the system shown in FIG. 14 may be used.

FIG. 14 is a diagram representing a fuel level optical sensor comprising two FPOF 6a and 6b having different photo response efficiencies. Each of the FPOFs 6a and 6b is positioned at a distance from a SPOF 4 inside a fuel tank 2 of an airplane. The fuel tank 2 contains fuel 10. The fuel level measurement system includes an electronics processor 20 (or controller), which is configured to achieve stable and reliable fuel level sensing as disclosed in U.S. Pat. No. 10,175,087, the disclosure of which is incorporated by reference herein in its entirety. Physically, as the fuel level changes, the optical power output of each FPOF is the summation of the optical power output due to photons from the SPOF 4 not absorbed by the air 8 and the optical power output due to photons from the SPOF 4 not absorbed by the fuel 10.

As shown in FIG. 14, the output of FPOF 6a is connected to a first variable optical attenuator 14a (indicated by the block labeled VOA1), while the output of FPOF 6b is connected to a second variable optical attenuator 14b (indicated by the block labeled VOA2). These variable optical attenuators are optical attenuators which attenuate (i.e., reduce the intensity of) the FPOF optical power outputs by applying external voltages. The degree of attenuation can be regulated by changing the magnitudes of the applied external voltages. The regulation of the magnitudes of the external voltages applied to the first and second variable optical attenuators 14a and 14b is controlled by respective control signals received from the electronics processor 20 through the electrical connector 22, which is electrically coupled to the electronics processor 20 as shown in FIG. 14.

The design of the dual-FPOF fuel level sensor uses FPOF 6a as the fuel level sensing FPOF and FPOF 6b as the reference FPOF. During a calibration procedure, electronic digital data representing the fuel levels versus respective optical power outputs are recorded in a look-up table stored in a non-transitory tangible computer-readable storage medium, such as the non-volatile memory of the electronics processor 20. In addition, a third-order equation is derived that fits the digital calibration data. This third-order equation can be used to interpolate between two stored values in the look-up table when the optical power output from FPOF 6a is a value between those two stored values. The relationship of fuel level h versus optical power is derived from the measurement data acquired during calibration and stored (as electronic digital data) in the processor's memory.

The FPOFs 6a and 6b are respectively connected to the first and second variable optical attenuators 14a and 14b via hermetic optical fiber connectors 12c and 12b respectively. The optical power outputs from the first and second variable optical attenuators 14a and 14b are optically coupled to first and second optical detectors 16a and 16b respectively. The magnitude of the signals output by the first and second optical detectors 16a and 16b increases monotonically with increasing intensity of light emitted from the ends of FPOFs 6a and 6b. The photo-current output from the first optical detector 16a is electrically coupled to a first transimpedance amplifier 18a (indicated by the block labeled TIA1) and the photo-current output from the second optical detector 16b is electrically coupled to a second transimpedance amplifier 18b (indicated by the block labeled TIA2). A transimpedance amplifier is a current-to-voltage converter, most often implemented using an operational amplifier. The first and second transimpedance amplifiers 18a and 18b convert the photo-currents to respective voltages V1 and V2 which are linearly proportional to the optical power outputs from the first and second variable optical attenuators 14a and 14b. The voltages V1 and V2 are applied to respective input ports of the electronics processor 20 through the electrical connector 22 as shown in FIG. 14.

The light source 24 that provides the optical power input to the SPOF 4 via the hermetic optical fiber connector 12a is either a high-power LED or a laser. The horizontal arrows in FIG. 14 represent light (i.e., photons) propagating from the SPOF 4 to the FPOFs 6a and 6b during operation of light source 24. The light source 24 is electrically coupled to a light source power controller 26 (indicated by the block labeled LSPC in FIG. 14), which is configured to stabilize the optical power input during variations in temperature and over the lifetime of the dual-FPOF fuel level sensor's operation in response to control signals from the electronics processor 20.

The electronics processor 20 is configured to send the fuel level data to a fuel level indicator 28 in the airplane. The electronics processor 20 may be a dedicated microprocessor or a general-purpose computer, and may calculate the measured level (i.e., height) of the fuel by using a look-up table, a calibration curve, or by solving equations, as appropriate. The fuel level indicator 28 may present information that identifies the amount of fuel present within the fuel tank 2 based on optical power data received by the electronics processor 20. The fuel level indicator 28 may take the form of a display device having a display processor programmed to display the measurement results (e.g., the fuel level) graphically and/or alphanumerically on a display screen.

Still referring to FIG. 14, the electronics processor 20 may be a computer or part of a flight control system located on an airplane. In identifying the amount of fuel present in an irregular-shaped fuel tank, the electronics processor 20 may execute various routines to calculate the amount of fuel present based on optical power data received from respective pairs of FPOFs 6a and 6b appropriately placed in various compartments of the fuel tank 2. The fuel information processing software may include routines that take into account the shape of the fuel tank 2 to determine the amount of fuel remaining in the fuel tank 2. The fuel information processing software may further include routines for calibrating processes to form a baseline before a first use or to maintain accuracy of fuel readings. The readings provided by the electronics processor 20 to the fuel level indicator 28 may be integrated or averaged before presentation and may be provided at different time intervals.

While optical fiber devices (e.g., optical fiber connectors) and methods for fabricating optical fiber devices have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used herein, the term "solder ring" means solder material which is initially in the shape of a ring having a constant initial cross-sectional profile about its circumference, but which may later deform during melting so that the post-melting solder material, although still ring-shaped, has a different cross-sectional profile which may not be constant.

The invention claimed is:

1. An optical fiber device comprising:
   a ferrule made of ceramic material and having a bore along a central axis comprising first and second cavities at opposing ends of the ferrule and a micro-bore segment connecting the first and second cavities, wherein the micro-bore segment and the first and second cavities are coaxial;
   a first layer of a metal on a surface of the first cavity;
   a second layer of the metal on a surface of the second cavity;
   a first solder ring disposed in the first cavity and having an opening;
   a second solder ring disposed in the second cavity and having an opening; and
   a coated optical fiber stub coated with a layer of the metal, a first portion of the coated optical fiber stub being disposed in the opening of the first solder ring, a second portion of the coated optical fiber stub being disposed in the micro-bore segment of the ferrule, and a third portion of the coated optical fiber stub being disposed in the opening of the second solder ring,
   wherein the first and second solder rings are made of a first solder material having a first melting temperature.

2. The optical fiber device as recited in claim 1, wherein:
   the first portion of the coated optical fiber stub is joined to the first cavity by a fusion of the first solder ring and the first layer of the metal on the surface of the first cavity; and
   the second portion of the coated optical fiber stub is joined to the second cavity by a fusion of the second solder ring and the second layer of the metal on the surface of the second cavity.

3. The optical fiber device as recited in claim 1, wherein first and second ends of the coated optical fiber stud are respectively even with first and second end faces of the ferrule.

4. The optical fiber device as recited in claim 1, wherein the metal is gold.

5. The optical fiber device as recited in claim 4, wherein the first solder material is gold/tin solder.

6. The optical fiber device as recited in claim 1, further comprising metallization on a center region of an outer surface of the ferrule.

7. The optical fiber device as recited in claim 6, wherein the metallization comprises a layer of titanium on the center region of the outer surface of the ferrule, a layer of palladium on the layer of titanium, and a layer of gold on the layer of palladium.

8. The optical fiber device as recited in claim 6, further comprising a layer of a second solder material applied on the metallization, wherein the second solder material has a second melting temperature lower than the first melting temperature.

9. The optical fiber device as recited in claim 8, wherein the solder material is silver/tin solder.

10. The optical fiber device as recited in claim 1, further comprising:
   a layer of a second solder material disposed around a center region of an outer surface of the ferrule, wherein the second solder material has a second melting temperature lower than the first melting temperature; and
   first and second split sleeves, one end of the ferrule being disposed inside a first portion of the first split sleeve and another end of the ferrule being disposed inside a first portion of the second split sleeve to form a ferrule assembly, a second portion of each of the first and second split sleeves being configured to receive a terminus containing a terminal portion of an optical fiber,
   wherein the layer of the second solder material is disposed between respective end faces of the first and second split sleeves.

11. The optical fiber device as recited in claim 10, further comprising a fiber alignment fixture made of metal and having an external annular protrusion and a bore, the bore having first and second cavities formed in opposite end sections which are configured to receive respective termini and a bore segment in a middle section which connects the first and second cavities and is configured to hold the ferrule assembly, wherein a portion of the middle section from which the external annular protrusion protrudes is joined to the ferrule by the layer of the second solder material.

12. The optical fiber device as recited in claim 11, further comprising:
   a bulkhead fixture made of metal and having an external flange and a bore in which a portion of the fiber alignment fixture including the external annular protrusion is seated; and
   third and fourth solder rings which join the external annular protrusion to the bulkhead fixture, wherein the third and fourth solder rings are made of a third solder material having a third melting temperature lower than the second melting temperature.

13. A method for fabricating an optical fiber device, the method comprising:
   (a) plating respective surfaces of first and second cavities of a ferrule with a metal, the ferrule being made of ceramic material and having an axial bore comprising the first and second cavities and a micro-bore segment connecting the first and second cavities;
   (b) coating an optical fiber stub with a layer of the metal to provide a coated optical fiber stub, the optical fiber stub having a length greater than a length of the ferrule;
   (c) placing a center section of the coated optical fiber stub inside the micro-bore segment with respective end sections of the coated optical fiber stub projecting beyond first and second end faces respectively of the ferrule;
   (d) placing one end of the coated optical fiber stub in an opening of a first solder ring made of a first solder material having a first melting temperature;
   (e) placing the first solder ring inside the first cavity;
   (f) placing another end of the coated optical fiber stub in an opening of a second solder ring made of the first solder material;
   (g) placing the second solder ring inside the second cavity; and
   (h) soldering the coated optical fiber stub to the surfaces of the first and second cavities of the ferrule by concurrently heating the first and second solder rings to a temperature equal to or greater than a melting temperature of the first solder material.

14. The method as recited in claim 13, further comprising cleaving the one end of the coated optical fiber stub even with the first end face of the ferrule and cleaving the other end of the coated optical fiber stub even with the second end face of the ferrule.

15. The method as recited in claim 13, further comprising:
   (i) metallizing a center region of an outer surface of the ferrule; and
   (j) applying a layer of a second solder material on the metallized center region, wherein the second solder material has a second melting temperature lower than the first melting temperature.

16. The method as recited in claim 15, further comprising:
   (k) inserting one end of the ferrule inside a portion of a first split sleeve and inserting another end of the ferrule inside a portion of a second split sleeve to form a ferrule assembly,
   wherein the layer of the second solder material is disposed between respective end faces of the first and second split sleeves.

17. The method as recited in claim 16, further comprising:
   (l) placing the ferrule assembly inside an opening in a middle section of a bore of a fiber alignment fixture made of metal and having a first external annular protrusion; and
   (m) soldering the ferrule assembly inside the fiber alignment fixture by heating the first external annular protrusion to a degree that a temperature of the layer of the second solder material becomes equal to or greater than the second melting temperature.

18. The method as recited in claim 17, further comprising:
   (n) seating third and fourth solder rings made of a third solder material in respective annular recesses formed adjacent to respective end faces of the first external annular protrusion, wherein the third solder material has a third melting temperature lower than the second melting temperature;
   (o) placing the first external annular protrusion of the fiber alignment fixture and third and fourth solder rings inside a bore of a bulkhead fixture made of metal and having a second external annular protrusion and an external flange so that respective end sections of the fiber alignment fixture project beyond first and second end faces respectively of the bulkhead fixture; and (p) soldering the fiber alignment fixture inside the bulkhead fixture to form a bulkhead assembly by heating the second external annular protrusion of the bulkhead fixture to a degree that a temperature of the third and fourth solder rings becomes equal to or greater than the third melting temperature.

19. The method as recited in claim 18, wherein the first solder material is gold/tin solder, the second solder material is silver/tin solder, and the third solder material is lead/tin solder.

20. The method as recited in claim 18, further comprising hermetically installing the bulkhead assembly in an opening in a wall of a fuel tank.

21. An airplane comprising:
a fuel tank having a wall with an opening;
a bulkhead assembly hermetically installed in the opening in the wall of the fuel tank;
a first optical fiber cable disposed inside the fuel tank and comprising a first terminus inserted in a first cavity at one end of the bulkhead assembly and a first optical fiber that terminates inside the first terminus; and
a second optical fiber cable disposed outside the fuel tank and comprising a second terminus inserted in a second cavity at another end of the bulkhead assembly and a second optical fiber that terminates inside the second terminus,
wherein the bulkhead assembly comprises:
a ferrule having a bore segment; and
an optical fiber stub comprising a first portion disposed inside the bore segment of the ferrule, a first end face in contact with an end face of the first optical fiber and a second end face in contact with an end face of the second optical fiber for optically coupling the first optical fiber to the second optical fiber.

22. The airplane as recited in claim 21, wherein:
the ferrule is made of ceramic material and has first and second cavities connected by the bore segment, the first and second cavities having respective metal-plated surfaces;
the bulkhead assembly further comprises a first solder ring disposed in the first cavity and a second solder ring disposed in the second cavity; and
the optical fiber stub further comprises a second portion joined to the first cavity by the first solder ring and a third portion joined to the second cavity by the second solder ring.

* * * * *